United States Patent

(12) United States Patent
Haga et al.

(10) Patent No.: US 7,962,746 B2
(45) Date of Patent: Jun. 14, 2011

(54) COMPUTER SYSTEM AND PROGRAM CREATING DEVICE

(75) Inventors: Tomoyuki Haga, Nara (JP); Hiroshi Okuyama, Osaka (JP); Hideki Matsushima, Osaka (JP); Yoshikatsu Ito, Osaka (JP); Shigehiko Kimura, Osaka (JP); Yasuki Oiwa, Osaka (JP); Takafumi Kagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 11/915,198

(22) PCT Filed: May 30, 2006

(86) PCT No.: PCT/JP2006/310744
§ 371 (c)(1),
(2), (4) Date: Nov. 21, 2007

(87) PCT Pub. No.: WO2006/129641
PCT Pub. Date: Dec. 7, 2006

(65) Prior Publication Data
US 2009/0106832 A1 Apr. 23, 2009

(30) Foreign Application Priority Data

Jun. 1, 2005 (JP) .................................. 2005-161359

(51) Int. Cl.
*H04L 29/06* (2006.01)
(52) U.S. Cl. .......... 713/166; 713/175; 713/189; 726/16; 726/22; 726/27
(58) Field of Classification Search .................... 726/16, 726/22, 27; 713/175, 189, 166, 164
See application file for complete search history.

(56) References Cited

U.S. PATENT DOCUMENTS 5,303,378 A * 4/1994 Cohen .......................... 710/264
(Continued)

FOREIGN PATENT DOCUMENTS

JP 11-15705 1/1999
(Continued)

OTHER PUBLICATIONS

International Search Report issued Aug. 15, 2006 in the International (PCT) Application of which the present application is the U.S. National Stage.

(Continued)

*Primary Examiner* — David García Cervetti
(74) *Attorney, Agent, or Firm* — Wenderoth, Lind & Ponack. L.L.P.

(57) ABSTRACT

A mobile telephone includes a CPU that obtains and decodes instructions included in an OS, a nonsecure program, a switch device driver, and a secure program, and operates according to the decoding results. A memory includes a controlled area and an uncontrollable area. The OS has only the controlled area as its access space, and includes an instruction for mediating access of the nonsecure program to the controlled area and an instruction for instructing the switch device driver to make a switch to the secure program. The nonsecure program includes an instruction to access the controlled area via the OS. The switch device driver includes an instruction to make a switch from execution of the OS to execution of the secure program in response to an instruction of the OS. The secure program has only the uncontrollable area as its access space, and includes an instruction to access the uncontrollable area.

9 Claims, 13 Drawing Sheets

U.S. PATENT DOCUMENTS

| | | | | |
|---|---|---|---|---|
| 5,353,411 A * | 10/1994 | Nakaosa et al. | | 713/1 |
| 5,515,538 A * | 5/1996 | Kleiman | | 710/260 |
| 5,522,072 A * | 5/1996 | De Bruler | | 712/220 |
| 5,530,870 A * | 6/1996 | De Bruler | | 717/155 |
| 5,757,919 A * | 5/1998 | Herbert et al. | | 713/187 |
| 5,826,057 A * | 10/1998 | Okamoto et al. | | 703/24 |
| 5,892,899 A * | 4/1999 | Aucsmith et al. | | 726/27 |
| 6,144,607 A | 11/2000 | Sassa | | |
| 6,269,409 B1 * | 7/2001 | Solomon | | 719/329 |
| 6,385,727 B1 * | 5/2002 | Cassagnol et al. | | 713/193 |
| 6,711,605 B2 * | 3/2004 | Sekiguchi et al. | | 718/100 |
| 6,772,419 B1 * | 8/2004 | Sekiguchi et al. | | 719/319 |
| 6,889,378 B2 * | 5/2005 | Sueyoshi | | 719/310 |
| 6,996,828 B1 * | 2/2006 | Kimura et al. | | 719/319 |
| 7,117,284 B2 * | 10/2006 | Watt et al. | | 710/261 |
| 7,124,274 B2 * | 10/2006 | Watt et al. | | 711/202 |
| 7,140,015 B1 * | 11/2006 | Bhanjois et al. | | 718/100 |
| 7,149,862 B2 * | 12/2006 | Tune et al. | | 711/163 |
| 7,149,878 B1 * | 12/2006 | Jensen et al. | | 712/209 |
| 7,155,590 B2 * | 12/2006 | Mathis | | 711/164 |
| 7,171,539 B2 * | 1/2007 | Mansell et al. | | 711/203 |
| 7,185,159 B2 * | 2/2007 | Beinet et al. | | 711/163 |
| 7,231,476 B2 * | 6/2007 | Watt et al. | | 710/200 |
| 7,272,832 B2 * | 9/2007 | Gardner | | 718/105 |
| 7,305,534 B2 * | 12/2007 | Watt et al. | | 711/163 |
| 7,305,712 B2 * | 12/2007 | Watt et al. | | 726/30 |
| 7,313,797 B2 * | 12/2007 | Sundaram et al. | | 718/108 |
| 7,325,083 B2 * | 1/2008 | Watt et al. | | 710/261 |
| 7,340,573 B2 * | 3/2008 | Watt | | 711/163 |
| 7,370,210 B2 * | 5/2008 | Symes | | 713/189 |
| 7,383,587 B2 * | 6/2008 | Watt et al. | | 726/30 |
| 7,401,335 B2 * | 7/2008 | Pizzi et al. | | 718/104 |
| 7,448,050 B2 * | 11/2008 | Watt et al. | | 719/319 |
| 7,487,367 B2 * | 2/2009 | Belnet et al. | | 713/194 |
| 7,523,279 B2 * | 4/2009 | Nanki et al. | | 711/163 |
| 7,539,853 B2 * | 5/2009 | Orion et al. | | 712/244 |
| 7,661,104 B2 * | 2/2010 | Watt et al. | | 718/100 |
| 7,712,104 B2 * | 5/2010 | Sekiguchi et al. | | 718/107 |
| 7,788,487 B2 * | 8/2010 | Ito et al. | | 713/164 |
| 7,849,296 B2 * | 12/2010 | Watt et al. | | 712/227 |
| 7,849,310 B2 * | 12/2010 | Watt et al. | | 713/164 |
| 2001/0016879 A1 * | 8/2001 | Sekiguchi et al. | | 709/319 |
| 2002/0029301 A1 * | 3/2002 | Toda | | 709/319 |
| 2002/0116632 A1 * | 8/2002 | Itoh et al. | | 713/200 |
| 2002/0184046 A1 * | 12/2002 | Kamada et al. | | 705/1 |
| 2002/0184398 A1 * | 12/2002 | Orenshteyn | | 709/310 |
| 2003/0101322 A1 * | 5/2003 | Gardner | | 711/163 |
| 2003/0179883 A1 * | 9/2003 | Uchida | | 380/28 |
| 2003/0188187 A1 * | 10/2003 | Uchida | | 713/200 |
| 2004/0105298 A1 * | 6/2004 | Symes | | 365/149 |
| 2004/0139346 A1 * | 7/2004 | Watt et al. | | 713/200 |
| 2004/0143720 A1 * | 7/2004 | Mansell et al. | | 711/206 |
| 2004/0148480 A1 * | 7/2004 | Watt et al. | | 711/163 |
| 2004/0153593 A1 * | 8/2004 | Watt et al. | | 710/200 |
| 2004/0153672 A1 * | 8/2004 | Watt et al. | | 713/201 |
| 2004/0158727 A1 * | 8/2004 | Watt et al. | | 713/193 |
| 2004/0158736 A1 * | 8/2004 | Watt et al. | | 713/200 |
| 2004/0163013 A1 * | 8/2004 | Watt et al. | | 714/30 |
| 2004/0168078 A1 * | 8/2004 | Brodley et al. | | 713/200 |
| 2004/0170046 A1 * | 9/2004 | Belnet et al. | | 365/145 |
| 2004/0172633 A1 * | 9/2004 | Pizzi et al. | | 718/104 |
| 2004/0177261 A1 * | 9/2004 | Watt et al. | | 713/193 |
| 2004/0177269 A1 * | 9/2004 | Belnet et al. | | 713/200 |
| 2004/0181682 A1 * | 9/2004 | Orino et al. | | 713/200 |
| 2004/0187019 A1 * | 9/2004 | Nanki et al. | | 713/200 |
| 2004/0187117 A1 * | 9/2004 | Orion et al. | | 718/100 |
| 2004/0237086 A1 * | 11/2004 | Sekiguchi et al. | | 718/100 |
| 2004/0243783 A1 * | 12/2004 | Ding et al. | | 711/170 |
| 2004/0260910 A1 * | 12/2004 | Watt et al. | | 712/43 |
| 2005/0071655 A1 * | 3/2005 | de Jong | | 713/190 |
| 2005/0114616 A1 * | 5/2005 | Tune et al. | | 711/163 |
| 2005/0160210 A1 * | 7/2005 | Watt et al. | | 710/269 |
| 2006/0015748 A1 * | 1/2006 | Goto et al. | | 713/190 |
| 2006/0277540 A1 * | 12/2006 | Bhattacharya | | 717/174 |
| 2007/0078891 A1 * | 4/2007 | Lescouet et al. | | 707/104.1 |
| 2007/0113079 A1 * | 5/2007 | Ito et al. | | 713/166 |
| 2007/0266374 A1 * | 11/2007 | Grisenthwaite et al. | | 717/127 |
| 2007/0283361 A1 * | 12/2007 | Blanchet et al. | | 718/107 |
| 2008/0155542 A1 * | 6/2008 | Maigne et al. | | 718/100 |
| 2009/0177830 A1 * | 7/2009 | Orion et al. | | 710/267 |
| 2009/0259846 A1 * | 10/2009 | Watt et al. | | 713/166 |
| 2009/0320048 A1 * | 12/2009 | Watt et al. | | 719/319 |

FOREIGN PATENT DOCUMENTS

JP    2002-251326    9/2002

OTHER PUBLICATIONS

Aucsmith et al., "Protecting Software Against Inverse Analysis and Tampering", Nekkei Electronics, No. 706, pp. 209-220, Jan. 1998 (including English translation).

Ishima et al., "Tamper Resistant Technology Software", Fuji Xerox Technical Report, No. 13, pp. 20-28, 2000 (including English translation).

Inoue et al., "The Protect II", Shuwa System Trading Co., Ltd., Sections 1.1, 3.1, and 3.2, Mar. 1987 (including partial English translation).

* cited by examiner

FIG. 9

API BRANCH TABLE

| | IDENTIFIER | BRANCH ADDRESS | |
|---|---|---|---|
| ZI SECTION B INITIALIZING API 801 | 1 | 0xFFA01000 | 811<br>802 |
| SECURE API_A 803 | 2 | 0xFFA02000 | 804 |
| SECURE API_B 805 | 3 | 0xFFA03000 | 806 |

800

813 812

COMPUTER SYSTEM AND PROGRAM CREATING DEVICE

BACKGROUND OF THE INVENTION

1. Technical Field

The present invention relates to a technology for preventing unauthorized tampering and analysis of a program.

2. Background Art

Technologies for preventing unauthorized tampering and analysis of a program have been studied to this date.

For instance, some software sold in a package requires the user to input a password in order to prevent the use of an illegal copy. In such software, a code (a computer program) for checking the correctness of the password is included. If by some means an unauthorized user finds a location within the software, at which the checking code is present and tampers with the code so as to void the checking operation, the unauthorized user can use the software without knowing the password.

In addition, paid digital content that can be viewed on a PC (personal computer) has been provided in recent years. Such paid digital content is encrypted so as to prevent unauthorized copying of the content, and software used to view the content includes a decryption algorithm and a decryption key for decrypting the encryption. If a malicious user is able to analyze the viewing software and thereby find the decryption key, the user can create software allowing for unauthorized copying of the digital content.

Thus, if software is analyzed, software-related and digital content-related businesses cannot be maintained. Therefore, the technology for preventing software analysis is absolutely essential.

For example, Non-patent Reference 1 describes fundamental principles and specific methods for preventing software analysis. Additionally, Non-patent Reference 2 discusses technological issues and measures of TRCS (Tamper Resistant Coding System) developed as a tool for preventing software analysis. Furthermore, Non-patent Reference 3 describes a technology for keeping software-based protection means (copy protect technology) used for preventing illegal copying of software from being voided.

These technologies for preventing unauthorized analysis and tampering of software are called "tamper resistant technologies".

<Non-patent Reference 1>"Gyaku-kaiseki ya Kaihen kara Soft wo Mamoru (Protecting Software from Inverse Analysis and Tampering)" Nikkei Electronics, 1998. 1. 5 (pp. 209-220)

<Non-patent Reference 2>"Software no Tai-tampering Technology (Software Tamper Resistant Technology)" Fuji Xerox Technical Report No. 13

<Non-patent Reference 3>"The Protect" Shuwa System Publication, 1985

<Patent Reference 1>Japanese Laid-Open Patent Application No. H11-15705

SUMMARY OF THE INVENTION

In the present day where multiple OSes are widely in use, analysis tools such as software debuggers that operate on the OSes have been relatively easily available.

As a result, even in the case where software that operates on an OS using a library dependent on the OS has been securely implemented so as to safely process confidential information, not being known to third persons, it is problematic because the software has low resistance to a debugger operating on the OS. That is, there is a risk that unauthorized analyzers may determine a region of the software which calls the OS-dependent library, using the debugger operating on the OS, and may consequently determine confidential information.

In view of the above problem, the present invention aims at offering a computer system, an integrated circuit and a program generating apparatus that make it difficult for an unauthorized analyzer to determine confidential processing.

In order to achieve the above object, the present invention is a computer system, comprising: a processor operable to fetch and decode instructions included in a basic program, a normal program and a secure program, and operate according to decoding results; and a memory unit including a controlled area and an uncontrollable area which is different from the controlled area. Here, the basic program configures an operating system, and includes an instruction to mediate access of the normal program to the controlled area, which is an only access space for the access of the normal program. The normal program includes an instruction to access the controlled area via the basic program. The secure program is independent of the operating system, and includes an instruction to make access to the uncontrollable area, which is an only access space for the access of the secure program.

According to the structure, the secure program is able to make access to the uncontrollable area of the operating system without depending on the basic program, which is the operating system. On the other hand, the normal program is able to make access to the controlled area of the operating system via the basic program (i.e. the operating system), however, is unable to access the uncontrollable area. Accordingly, if the normal program is, for instance, a software debugger, the software debugger cannot access the uncontrollable area, and access to the uncontrollable area is only allowed to the secure program, thereby offering an excellent effect of security maintenance.

Here, the controlled area may store therein the basic program and the normal program. In this case, the uncontrollable area stores therein the secure program, and the processor fetches instructions included in the basic program and the normal program, and fetches an instruction included in the secure program.

According to the structure, since the secure program is stored in the uncontrollable area of the operating system, the software debugger is unable to access the secure program stored in the uncontrollable area. Consequently, the content of the secure program itself can be securely maintained.

Here, the secure program may include an instruction to perform a confidentiality process relating to confidential information stored in the uncontrollable area.

According to the structure, the software debugger is unable to make access to the confidential information stored in the uncontrollable area of the operating system. Consequently, the content of the confidential information can be securely maintained.

Here, the controlled area may further store therein a switch program including an instruction to make a switch from execution of the basic program to execution of the secure program in response to a direction of the basic program. In this case, the processor further fetches and decodes the instruction included in the switch program, and operates according to the decoding results. The basic program further includes an instruction to instruct the switch program to make the switch to the execution of the secure program. The secure program further includes an instruction to make a switch from the execution of the secure program to the execution of the basic program after the confidentiality process is finished.

According to the structure, the process can be temporarily transferred from the basic program to the secure program, which cannot be accessed under normal conditions, via the switch program in the case where the confidentiality process is required, and then the process can be again brought back to the basic program (i.e. the operating system) after the process of the secure program is finished. Herewith, the confidentiality process of the secure program can be used from the basic program while maintaining the security of the secure program.

Here, the switch program may include (i) an instruction to change settings of a stack pointer back to one used by the basic program at a time of the switch from the execution of the secure program to the execution of the basic program and (ii) an instruction to change the settings of the stack pointer back to one used by the secure program at a time of the switch from the execution of the basic program to the execution of the secure program.

According to the structure, at the time of the switch from the secure program to the basic program, the settings of the stack pointer are changed back to one used by the basic program. Herewith, the process of the basic program can be continued. In addition, at the time of the switching from the basic program to the secure program, the settings of the stack pointer are changed back to one used by the secure program. Accordingly, the process of the secure program can be continued.

Here, the secure program may have been obfuscated.

According to the structure, the obfuscation makes it difficult to analyze the secure program, thereby further increasing the security of the secure program.

In addition, data to be used by execution target software is generally initialized before a process of the software is performed. An unauthorized analyzer attempts to analyze target software from the initialization sequence of the software. In this case, the unauthorized analyzer may pay attention to the data initialization process and identify a location at which confidential information is used.

Here, the secure program may require an initialization process that is performed by a plurality of programs.

According to the structure, individual initialization processes are performed using a plurality of initialization programs, and thus the initialization processes are divided and performed in a dispersed manner. Consequently, it is possible to make it difficult to identify the location at which confidential information is used even if the unauthorized analyzer focuses on the data initialization process.

Here, the plurality of programs may be executed prior to the confidentiality process.

According to the structure, prior to the confidentiality process of the secure program, the initialization processes are performed by execution of the individual initialization programs. This prevents the confidentiality process from being performed erroneously due to the use of an incorrect initial value.

Here, part of the plurality of programs may be executed at a timing different from a timing at which remaining part of the programs is executed.

According to the structure, it is possible to make it further difficult to identify the location at which confidential information is used even if the unauthorized analyzer focuses on the data initialization process.

Furthermore, in the case where tamper resistant technology is applied to a mobile telephone and other electronics devices, the size of memory used by tamper resistant software is increased. Accordingly, the time required for the initialization process of the tamper resistant software also increases. The initialization process—from the point when a request for a desired process is made by the user to the point when software actually starts the process—requires a substantial amount of time although, regarding electronics devices, their response performance is seen as an important aspect.

Speeding up the memory initialization process is described in Patent Reference 1 as a memory control method. However, this method does not offer an effect of speeding up the data initialization process for a program and improving security.

Here, the part of the plurality of programs may be executed immediately after reset of the computer system, and the remaining part of the plurality of programs may be included in the secure program and executed when execution of the secure program is requested.

According to the structure, the initialization process of secure software operable in an environment independent of the OS is divided and performed in a dispersed manner. Thereby, the process time from the point when a request for a desired process is made by the user to the point when the secure software actually starts the process can be reduced, and also the resistance to a malicious analyzer can be enhanced.

As has been described, according to the present invention, the codes (present in the ROM) executed by the secure program and the work memory (present in the RAM) used by the secure program are positioned in an OS uncontrollable area, and it is therefore possible to prevent an analysis via a software debugger operating on the OS.

Furthermore, the initialization process of the RAM data of the secure program is divided, and it is therefore possible to shorten the process time from occurrence of a user's request for the secure program process until start-up of the secure program.

In addition, the divided initialization process is performed in a dispersed manner, which leads to an increase in the range to be analyzed. As a result, it is possible to make it difficult for a malicious analyzer to analyze the secure program based on the initialization process, and thus to increase the security level.

In addition, since the secure program operates in an environment independent of the OS, the portability of the secure program to another OS is significantly high. Furthermore, when the secure program is ported to another OS, there is no need to make a change to the secure program to comply with the OS. Thus, it is possible to port the secure program without reducing the security level.

BRIEF DESCRIPTION OF THE DRAWINGS

FIG. 9 is a data structural diagram showing a data structure of an API branch table 800;

EXPLANATION OF REFERENCES

Figure 1:
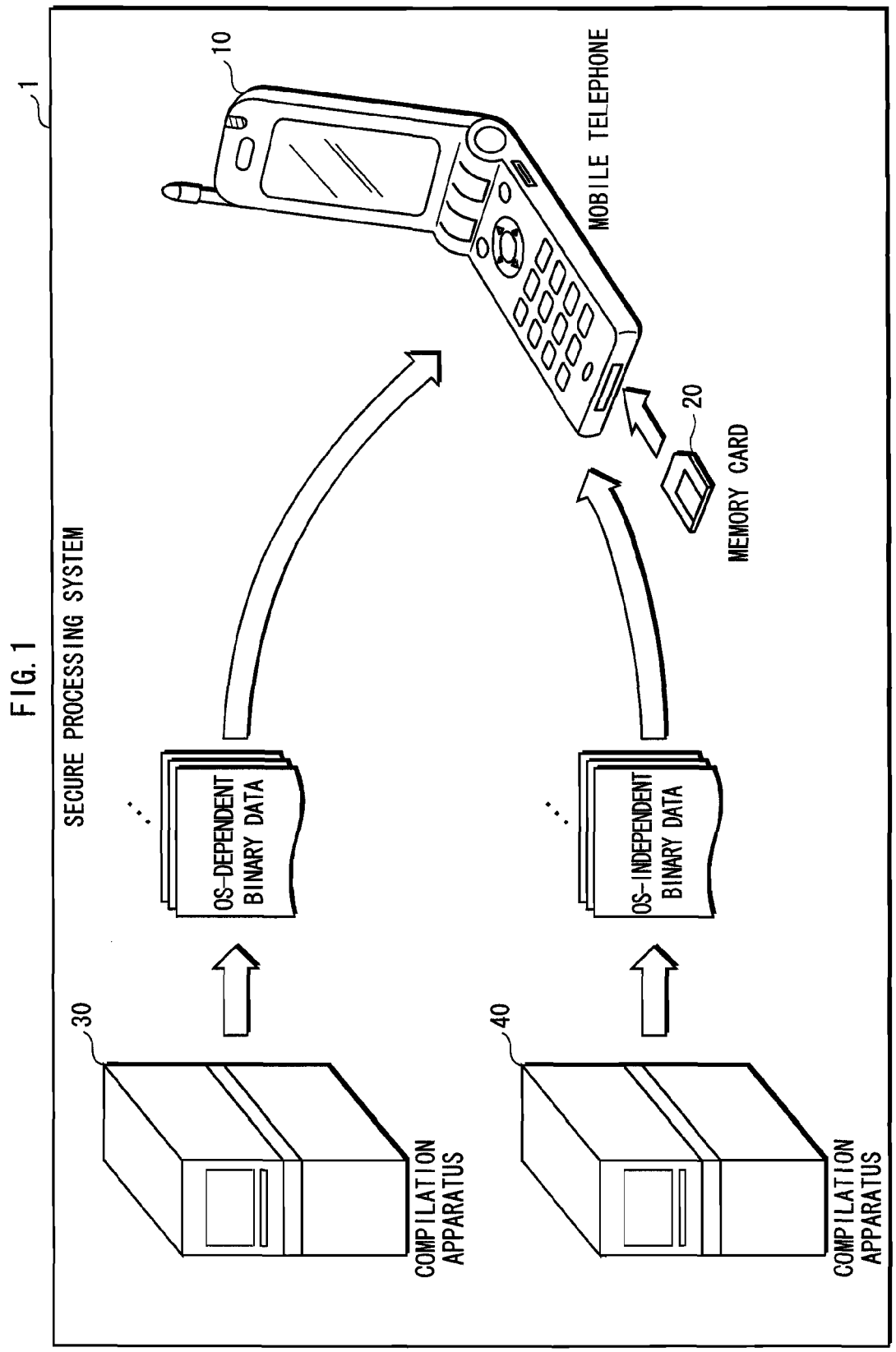
FIG. 1 is a system structural diagram showing a structure of a secure processing system 1.

10 mobile telephone
20 memory card
30 compilation apparatus
40 compilation apparatus
101 debugger I/F
102 CPU
103 MMU
104 interrupt controller
105 input unit
106 display unit
107 memory
108 input/output unit
109 buffer
110 code processing unit
111 D/A converting unit
112 radio communication control unit
113 speaker
114 microphone
115 communication unit
116 antenna
117 bus
120 normal area
122 input/output unit
130 secure area
132 secure processing unit
201 IPL program
202 secure program
210 OS program
211 nonsecure program
212 secure program calling part
213 switch device driver
310 OS-dependent compilation unit
320 OS-dependent link unit
330 format conversion unit
350 information storage unit
410 OS-independent compilation unit
420 OS-independent link unit
430 format conversion unit
450 information storage unit

DETAILED DESCRIPTION OF THE INVENTION

1. Embodiment

A secure processing system 1 is explained next as an embodiment of the present invention in reference to drawings.

1.1 Structure of Secure Processing System 1

The secure processing system 1 includes, as shown in FIG. 1: a compilation apparatus 30; a compilation apparatus 40; a mobile telephone 10; and a memory card 20. The memory card 20 is attached to the mobile telephone 10.

The compilation apparatus 30 generates one or more executable format computer programs (referred to as "OS-dependent binary data") from source programs describing kernel operations of an OS (Operating System; also referred to as "basic software" or a "basic program") installed on the mobile telephone 10 and source programs describing other operations dependent on the OS. The compilation apparatus 40 generates one or more executable format computer programs ("OS-independent binary data") from source programs describing other operations independent from the OS.

The mobile telephone 10 is, as described later, a computer system including a CPU (Central Processing Unit), a ROM (Read Only Memory), a RAM (Random Access Memory) and the like. The generated OS-dependent binary data and OS-independent binary data above are written to the ROM of the mobile telephone 10 by a ROM writer. Herewith, the ROM stores therein the OS-dependent binary data and OS-independent binary data that are computer programs, and the mobile telephone 10 realizes part of its functions when the CPU operates according to the computer programs. A part of the computer program of the OS-dependent binary data forms the OS; while the remaining part operates under the control of the OS.

The memory card 20 stores therein, for example, encrypted content generated by encrypting music or image content and a content key used to decrypt the encrypted content.

By operating according to the OS-dependent binary data and OS-independent binary data written to the ROM, the mobile telephone 10 reads the encrypted content from the memory card 20, decrypts the read encrypted content using the content key to generate decrypted content, and outputs the generated decrypted content as music or images.

1.2 Structure of Compilation Apparatus 30

Figure 2:
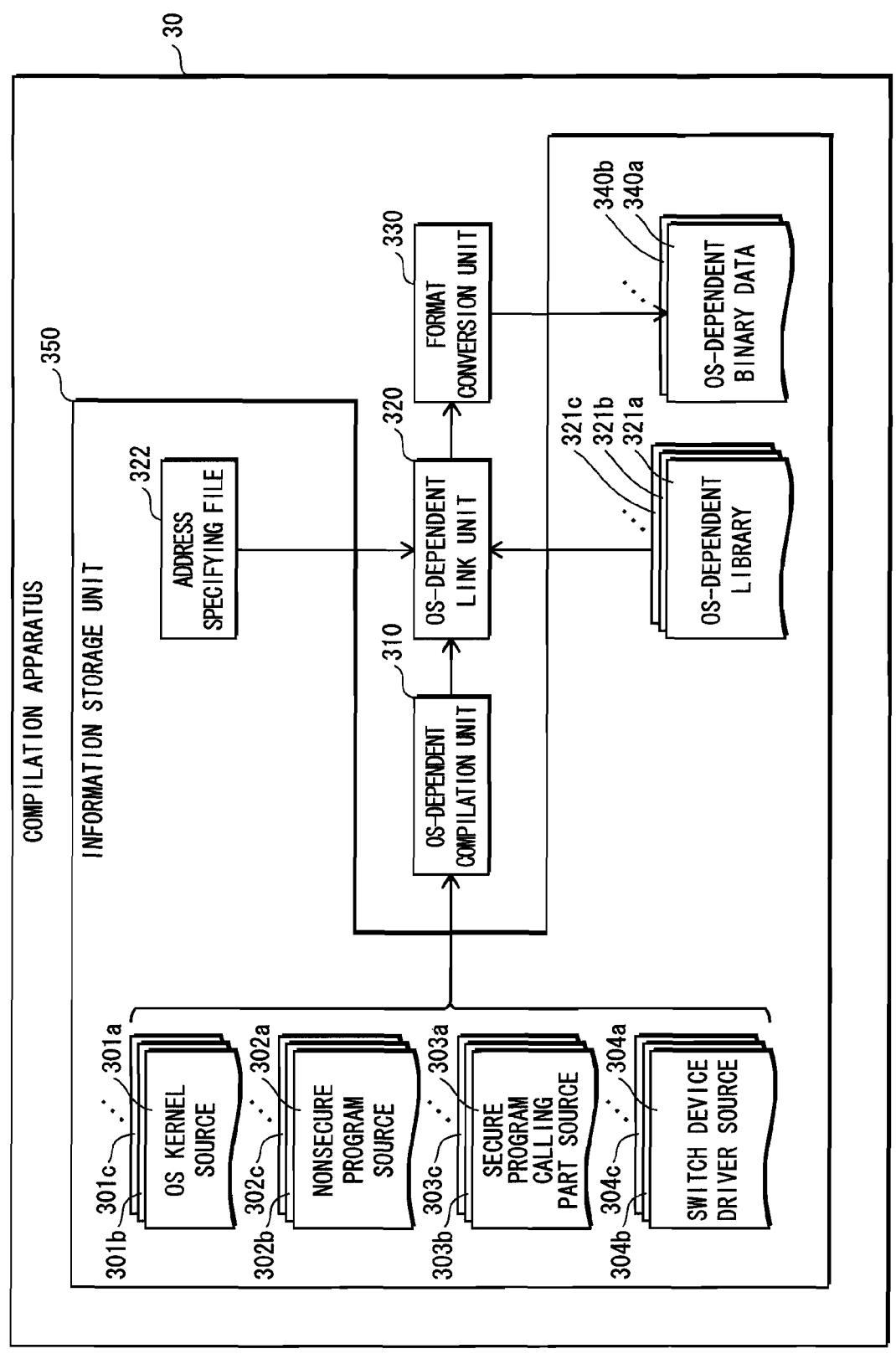
FIG. 2 is a block diagram showing a structure of a compilation apparatus 30.

The compilation apparatus (also referred to as a "program generation apparatus") 30 includes, as shown in FIG. 2: an OS-dependent compilation unit 310; an OS-dependent link unit 320; a format conversion unit 330; and an information storage unit 350. The compilation apparatus 30 generates binary data placed in an OS-controlled area of a memory 107 (to be later described) of the mobile telephone 10.

The compilation apparatus 30 is, specifically speaking, a computer system composed of a microprocessor, a ROM, a RAM, a hard disk unit, a display unit, a keyboard, a mouse and the like. A computer program is stored in the RAM or the hard disk unit. The microprocessor operates according to the computer program, and thereby the OS-dependent compilation unit 310, OS-dependent link unit 320 and format conversion unit 330 making up the compilation apparatus 30 fulfill their functions.

(1) Information Storage Unit 350

The information storage unit 350 stores therein OS kernel sources 301$a$, 301$b$, 301$c$, . . . , nonsecure program sources 302$a$, 302$b$, 302$c$, . . . , secure program calling part sources 303$a$, 303$b$, 303$c$, . . . , switch device driver sources 304$a$, 304$b$, 304$c$, . . . , an address specifying file 322, and OS-dependent libraries 321$a$, 321$b$, 321$c$, . . . . In addition, the information storage unit 350 has an area for storing OS-dependent binary data 340$a$, 340$b$, 340$c$, . . . .

The OS kernel sources 301$a$, 301$b$, 301$c$, . . . are computer programs which are parts of source codes (source programs) describing various processes of the OS installed on the mobile telephone 10, and includes computer instructions. The OS kernel sources 301$a$, 301$b$, 301$c$, . . . describe, with the entire source codes, the OS processes. The OS kernel sources 301$a$, 301$b$, 301$c$, . . . , as whole, correspond to binary data to be stored in the memory 107 of the mobile telephone 10 as an OS program 210 (to be later described).

Each of the nonsecure program sources (also referred to as "normal programs") 302$a$, 302$b$, 302$c$, . . . is a computer program which is a source code (a source program) describing a nonsecure process, and includes computer instructions. The nonsecure program source 302a corresponds to binary data to be stored in the memory 107 of the mobile telephone 10 as a nonsecure program 211 (to be later described).

The secure program calling unit source 303a is a computer program which is a source code (a source program) describing a process for requesting a switch device driver 213 (to be later described) to call a secure program 202 (to be later described) stored in the memory 107 of the mobile telephone 10, and includes computer instructions. The secure program calling unit source 303a corresponds to binary data to be stored in the memory 107 as a secure program calling part 212 (to be later described). The process of requesting the switch device driver 213 is assumed in the present embodiment to be performed by a library call of the OS program 210. The same applies to the secure program calling part sources 303b, 303c, . . . .

The switch device driver source 304a is a computer program which is a source code (a source program) describing a process for causing branching to a process of the secure program 202 requested by the secure program calling part 212 in the memory 107, and includes computer instructions. The switch device driver source 304a corresponds to binary data to be stored in the memory 107 as the switch device driver 213 (to be later described).

The address specifying file 322 is a file that specifies location addresses of binary ROM data and RAM data generated by the OS-dependent link unit 320. For example, the address specifying file 322 includes, with respect to each piece of OS-dependent binary data generated by the OS-dependent link unit 320, a physical address indicating a location in the memory of a target apparatus (i.e. mobile telephone 10), at which the OS-dependent binary data should be placed.

(2) OS-dependent Compilation Unit 310

The OS-dependent compilation unit 310 uses, as input thereto, the OS kernel sources 301a, 301b, 301c, . . . , nonsecure program sources 302a, 302b, 302c, . . . , secure program calling part sources 303a, 303b, 303c, . . . , and switch device driver sources 304a, 304b, 304c, . . . , and converts these program codes written in a high-level language into machine codes in a low-level language (object codes)—i.e. executable format computer program—to thereby generate object files.

(3) OS-Dependent Link Unit 320

The OS-dependent link unit 320 performs relocation and symbol resolution of each object file generated by the OS-dependent compilation unit 310. In the case when function symbols of the OS-dependent libraries 321a, 321b, 321c, . . . are present in each object file, the OS-dependent link unit 320 links relevant OS-dependent libraries to thereby generate OS-dependent binary data.

When the address specifying file 322 is specified, the OS-dependent link unit 320 places ROM data and RAM data at logical addresses written in the address specifying file 322.

(4) Format Conversion Unit 330

The format conversion unit 330 converts each piece of OS-dependent binary data generated by the OS-dependent link unit 320 into a format that can be written to the ROM memory by the ROM writer to thereby generate the OS-dependent binary data 340a, 340b, . . . , and writes the generated OS-dependent binary data 340a, 340b, . . . to the information storage unit 350. The data format generated by the format conversion unit 330 includes, for instance, the Intel HEX format and Motorola S-Record Format.

(5) Setting of OS Uncontrollable ROM/RAM

The compilation apparatus 30 sets OS uncontrollable ROM/RAM in the following manner.

(a) Securing of OS Uncontrollable RAM Area

In the case of allotting, with an OS having an access memory space starting at a physical address "0x10000000" and ending at a physical address "0x11FFFFFF", a space spanning from the physical address "0x10000000" to a physical address "0x11E0000" as a RAM area controlled by the OS (OS-controlled RAM area) and allotting a space spanning from a physical address "0x11F00000" to the physical address "0x11FFFFFF" as a RAM area outside the control of the OS (OS uncontrollable RAM area), the compilation apparatus 30 specifies the size of RAM memory parameter required at the time of starting up the kernel as "0x1E00000" (bytes) and performs a compilation.

Herewith, the area with the specified size "0x1E00000" starting from the physical address "0x10000000" becomes an OS-controlled RAM area and the remaining area becomes an OS uncontrollable RAM area.

(b) Setting of Physical-Logical Mapping of Secure Program OS Uncontrollable ROM and RAM Areas The following describes how to set physical-logical mapping of an OS uncontrollable ROM area and an OS uncontrollable RAM area for a secure program.

A source file that specifies memory mapping of the OS kernel includes a structure for specifying a memory map. In the case of Linux, map_desc standard_io_desc[ ]_initdata is provided as a structure for memory map specification.

static struct map_desc standard_io_desc[ ]_initdata= {MAP_DESC(logical address, physical address, size, domain attribute, READ attribute, WRITE attribute, CACHE attribute, BUFFER attribute);};

Here, for the logical address, a logical address desired to be associated with the physical address is specified. For the physical address, a physical address desired to be associated with the logical address is specified. For the size, a size for associating the logical and physical addresses is specified based on the above addresses. In the domain attribute, a kernel area or a user area is specified. In the READ attribute, "1" is set in the case of enabling READ; "0" is set in the case of disabling READ. In the WRITE attribute, "1" is set in the case of enabling WRITE; "0" is set in the case of disabling WRITE. In the CACHE attribute, "1" is set in the case of cache being enabled; "0" is set in the case of cache being disabled. In the BUFFER attribute, "1" is set in the case of BUFFER being enabled; "0" is set in the case of BUFFER being disabled.

Figure 7:
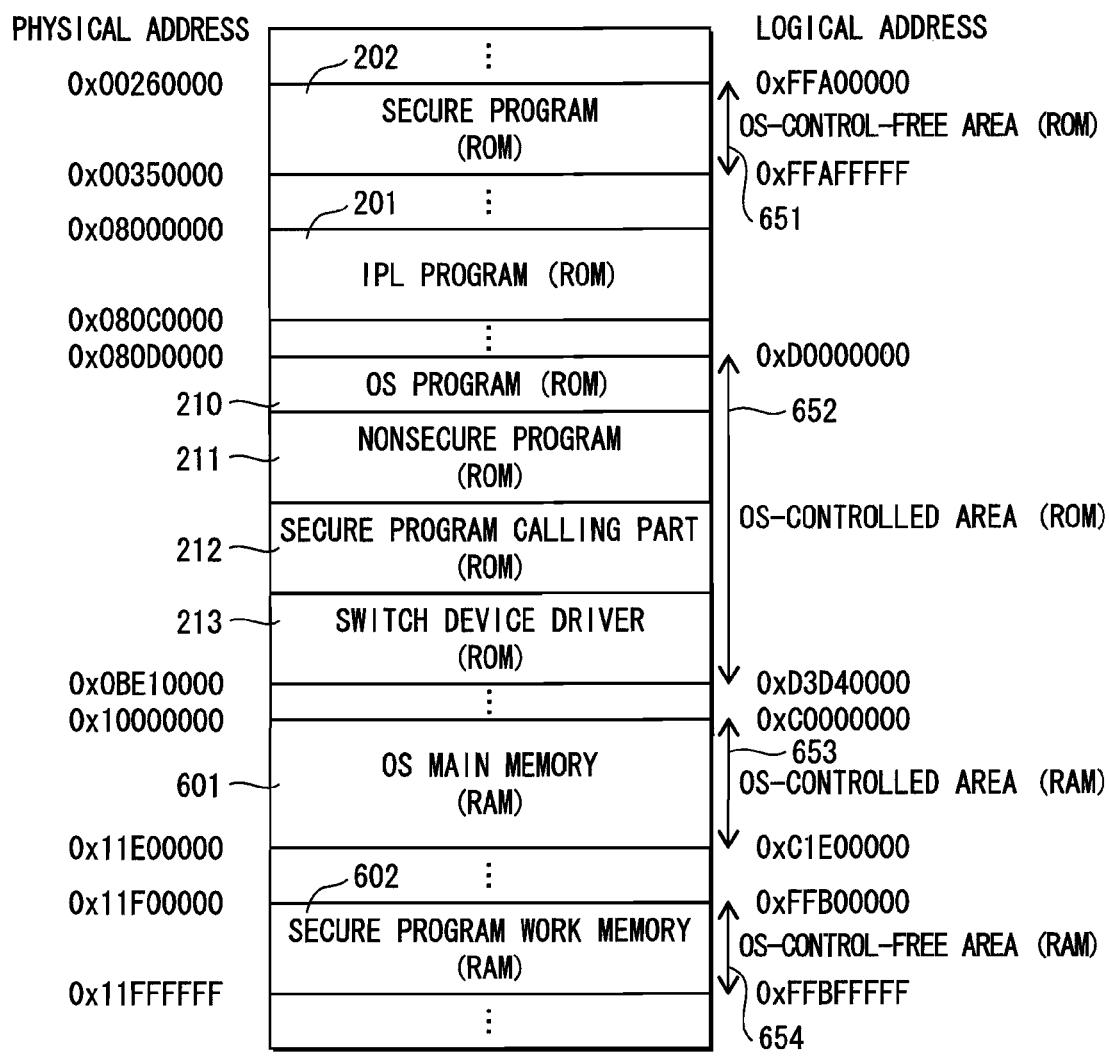
FIG. 7 shows a correspondence between physical and logical addresses in the memory 107.

As shown in FIG. 7 to be later described, in the case of specifying OS uncontrollable ROM and RAM, the compilation apparatus 30 writes a source file in the structure as shown below, and compiles a kernel source file including the source file.

static struct map_desc standard_io_desc[ ]_initdata= {MAP_DESC(0xFFB00000, 0x11F00000, 0x000FFFFF, DOMAIN_KERNEL,0,1,1,1),/*Secure Program RAM*/ MAP_DESC(0xFFA00000, 0x00260000, 0x000FFFFF,DOMAIN_KERNEL,0,0,1,1),/*Secure Program ROM*/};

Note that the domain attribute of a secure program is a kernel domain, prohibiting an access thereto from normal software operating on the OS.

In addition, an access to a memory for a secure program is realized via the switch device driver, and therefore it is necessary that READ/WRITE is executable from the device driver and the cache is enabled.

(6) Summary

As has been described, each of the OS kernel sources 301a, 301b, 301c, . . . , nonsecure program sources 302a, 302b, 302c, . . . , secure program calling part sources 303a, 303b, 303c, . . . , and switch device driver sources 304a, 304b, 304c, . . . , is compiled by the OS dependent compilation unit 310. Object files created by the compilation are subject to the link process performed by the OS-dependent link unit 320. The OS-dependent binary data generated by the OS-dependent link unit 320 is converted by the format conversion unit 330 into a format that can be written to the ROM. Then, the OS-dependent binary data 340a, 340b, . . . are written to the information storage unit 350.

The OS (basic program) has only the OS-controlled area as its access space, and includes an instruction for mediating the access of a nonsecure program (normal program) to the OS-controlled area and an instruction for instructing the switch device driver (switch program) to make a switch to a secure program.

A nonsecure program (normal program) includes an instruction to access the OS-controlled area via the OS (basic program).

The switch device driver (switch program) includes an instruction to make a switch from execution of the OS (basic program) to execution of secure program in response to an instruction of the OS (basic program).

A secure program has only the OS uncontrollable area as its access space, and includes an instruction to access the OS uncontrollable area. The secure program also includes an instruction to make a switch from execution of the secure program to execution of a basic program after the completion of a target process of the secure program—for example, a process of decrypting encrypted content using the content key.

1.3 Structure of Compilation Apparatus 40

Figure 3:
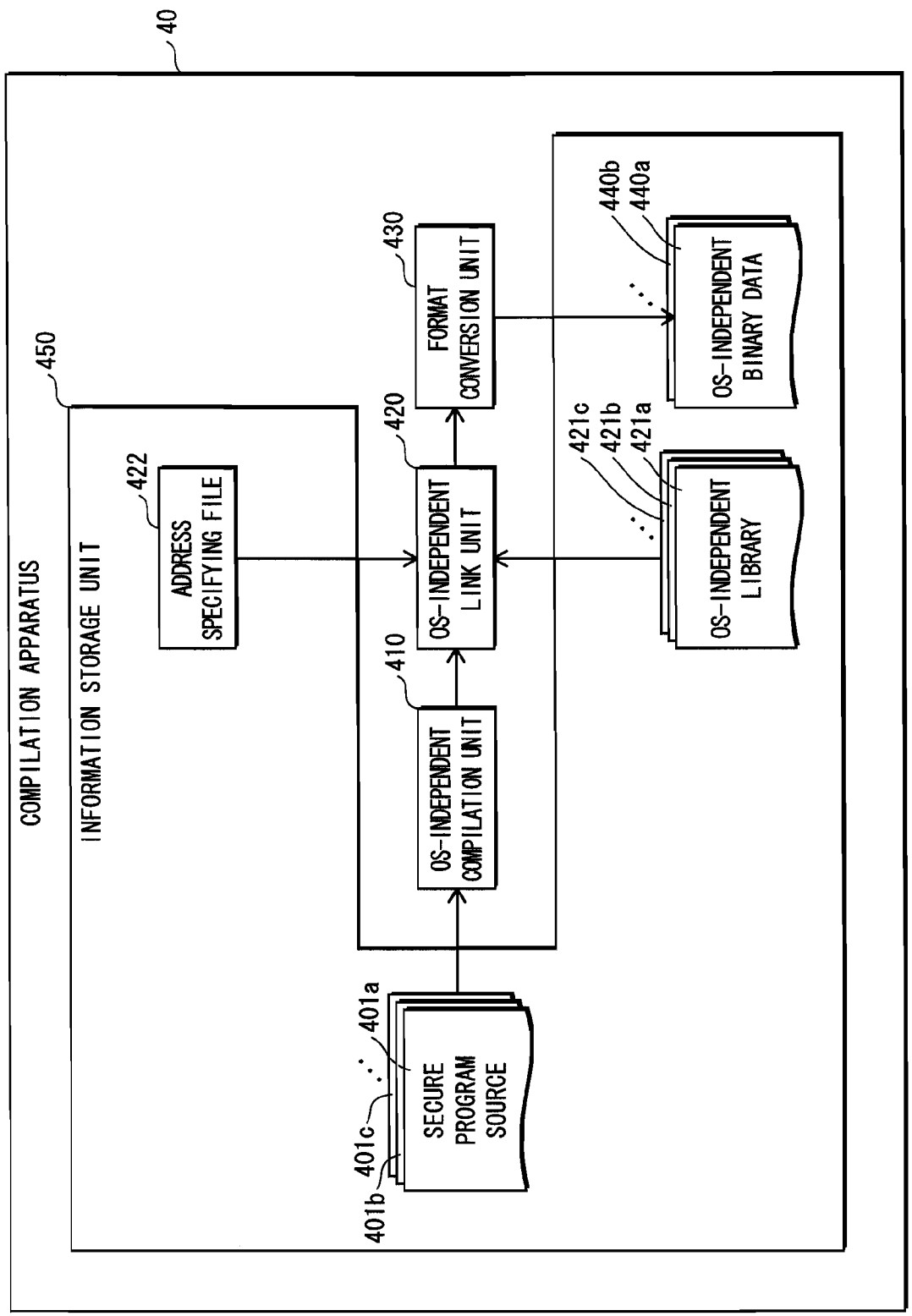
FIG. 3 is a block diagram showing a structure of a compilation apparatus 40.

The compilation apparatus (also referred to as a "program generation apparatus") 40 includes, as shown in FIG. 3: an OS-independent compilation unit 410; an OS-independent link unit 420; a format conversion unit 430; and an information storage unit 450. The compilation apparatus 40 generates binary data placed in an OS uncontrollable area of the memory 107 (to be later described) of the mobile telephone 10.

The compilation apparatus 40 is, specifically speaking, a computer system composed of a microprocessor, a ROM, a RAM, a hard disk unit, a display unit, a keyboard, a mouse and the like. A computer program is stored in the RAM or the hard disk unit. The microprocessor operates according to the computer program, and thereby the OS-independent compilation unit 410, OS-independent link unit 420 and format conversion unit 430 making up the compilation apparatus 40 fulfill their functions.

The information storage unit 450 stores therein secure program sources 401a, 401b, 401c, . . . , an address specifying file 422, and OS-independent libraries 421a, 421b, 421c, . . . . In addition, the information storage unit 450 has an area for storing OS-independent binary data 440a, 440b, 440c, . . . .

The secure program source 401a is a computer program which is a source code (a source program) describing a process that uses confidential information, and includes computer instructions. The secure program source 401a is assumed in the present embodiment to be a code that describes a decryption process for decrypting encrypted content, and corresponds to binary data stored in the memory 107 as the secure program 202 (to be later described). The same applied to the secure program sources 401b, 401c, . . . .

The address specifying file 422 is the same as the address specifying file 322 in FIG. 2, and therefore the explanation is omitted here. Note however that, because the generated secure program 202 and the like corresponding to the secure program sources 401a, 401b, 401c, . . . are placed in an uncontrollable area of the OS program 210, the address specifying file 422 specifies addresses of the uncontrollable area.

The OS-independent compilation unit 410 converts source codes describing OS-independent processes in a high-level language into machine codes in a low-level language (object codes). The OS-independent compilation unit 410 creates a machine code appropriate for the architecture of the CPU 102.

The OS-independent link unit 420 performs relocation and symbol resolution, and links OS-independent libraries, if necessary, to generate binary data executable on the CPU 102. The term "OS-independent" means not linking the OS-dependent libraries 321a, 321b, 321c, . . . .

The format conversion unit 430 is the same as the format conversion unit 330 in FIG. 2, and therefore the explanation is omitted here.

1.4 Structure of Memory Card 20

Figure 4:
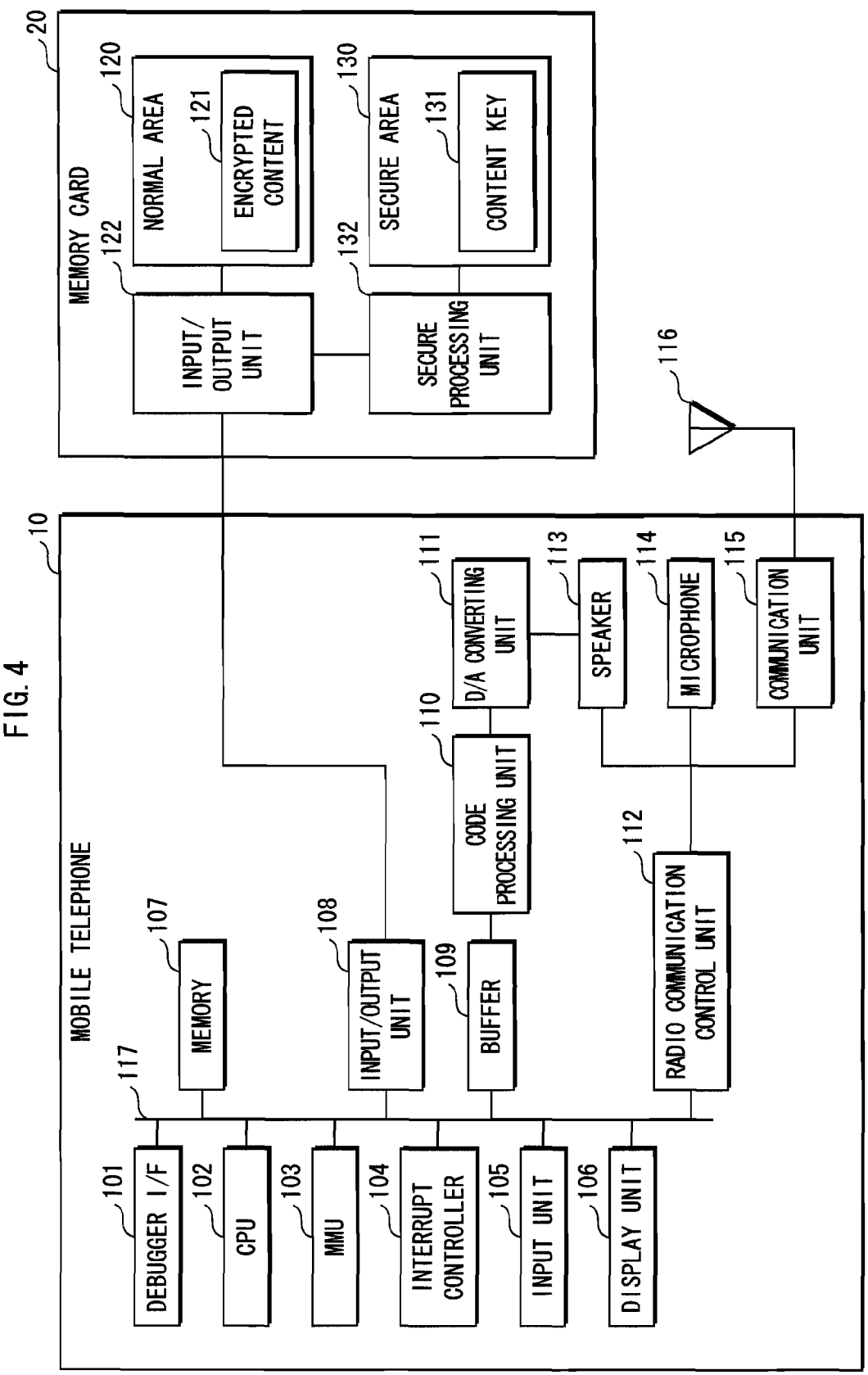
FIG. 4 is a block diagram showing structures of a memory card 20 and a mobile telephone 10.

The memory card 20 includes, as shown in FIG. 4: a normal area 120; a secure area 130; an input/output unit 122; and a secure processing unit 132.

The memory card 20 is, specifically speaking, a computer system composed of a microprocessor, a ROM, a RAM and the like. A computer program is stored in the RAM. The microprocessor operates according to the computer program, and thereby the memory card 20 fulfills a part of its functions.

The normal area 120 is a storage area to which an external apparatus can freely make access. In the present embodiment, the normal area 120 stores therein encrypted content 121.

The secure area 130 is an area to which only an allowed external apparatus can make access, and stores therein a content key 131.

The encrypted content 121 is encrypted music or video data that has been encrypted by an encryption algorithm with the use of the content key 131 as an encryption key. Each piece of encrypted data is identified by a content ID. Note that, in the present embodiment, it is assumed that the encrypted content 121 has been encrypted using a common key system, and decrypted content—i.e. music data or video data—can be obtained by using the content key 131 as a decryption key.

The input/output unit 122 inputs and outputs various data to/from an external apparatus, the normal area 120 and the secure processing unit 132.

The secure processing unit 132 performs mutual authentication with an external apparatus based on the CPRM (Content Protection for Recordable Media) specification. When the authentication is successful, the secure processing unit 132 shares a key with an apparatus with which the authentication was performed. With the shared key, inputs and outputs of data are safely performed with the external apparatus. Note that CPRM is publicly known, and therefore the explanation is omitted here.

1.5 Structure of Mobile Telephone 10

The mobile telephone 10 includes, as shown in FIG. 4: a debugger IF 101; a CPU 102; an MMU (Memory Management Unit) 103; an interrupt controller 104; an input unit 105; a display unit 106; a memory 107; an input/output unit 108; a buffer 109; a code processing unit 110; a D/A converting unit 111; a radio communication control unit 112; a speaker 113; a microphone 114; a communication unit 115; and an antenna 116. These circuits are connected by a bus 117.

(1) Components of Mobile Telephone 10

The memory 107 is composed of a ROM and a RAM, and stores therein various programs executed by the CPU 102.

The CPU 102 includes an instruction fetch unit, an instruction decoder, a computing unit, a program counter, a link register, a stack pointer and the like. The CPU 102 fetches an instruction from a program in the memory 107, decodes the fetched instruction, and executes the decoded instruction.

The MMU 103 realizes a virtual storage function for converting a logical address into a physical address.

The debugger IF 101 is an interface for connecting the mobile telephone 10 and an external debugger.

The interrupt controller 104 detects various interrupts—interrupts of hardware, such as FIQ and IRQ, and software (SWI), prefetch aborts, data aborts and resets, and outputs a notice of an interrupt occurrence to an interrupt detection register of the CPI 102.

The communication unit 115 transmits and receives information, via the antenna 116, between the radio communication control unit 112 and external apparatuses connected to a mobile telephone network and/or the Internet.

The radio communication control unit 112 includes a base band unit, a modem unit, an amplification unit and the like, and performs signal processing of various information transmitted and received via the communication unit and the antenna 116.

The code processing unit 110 applies to music data stored in the buffer 109, a decoding process according to coding technology, such as MP3, and outputs the decoded music data to the D/A converting unit 111.

The D/A converting unit 111 converts the music data decoded by the code processing unit 110 into analog audio signals, and outputs the analog audio signals to the speaker 113.

The input unit 105 has various buttons including a numerical key pad, an enter key and the like, and receives the user's operations on the buttons.

The display unit 106 includes a VRAM and a liquid crystal display, and displays various screens.

The microphone 114 converts sound into electronic signals, and outputs the generated electronic signals to the radio communication control unit 112.

The speaker 113 receives analog signals from the radio communication control unit 112 and D/A converting unit 111, converts the received analog signals into sound, and then outputs the sound.

(2) Structure of Memory 107

Figure 5:
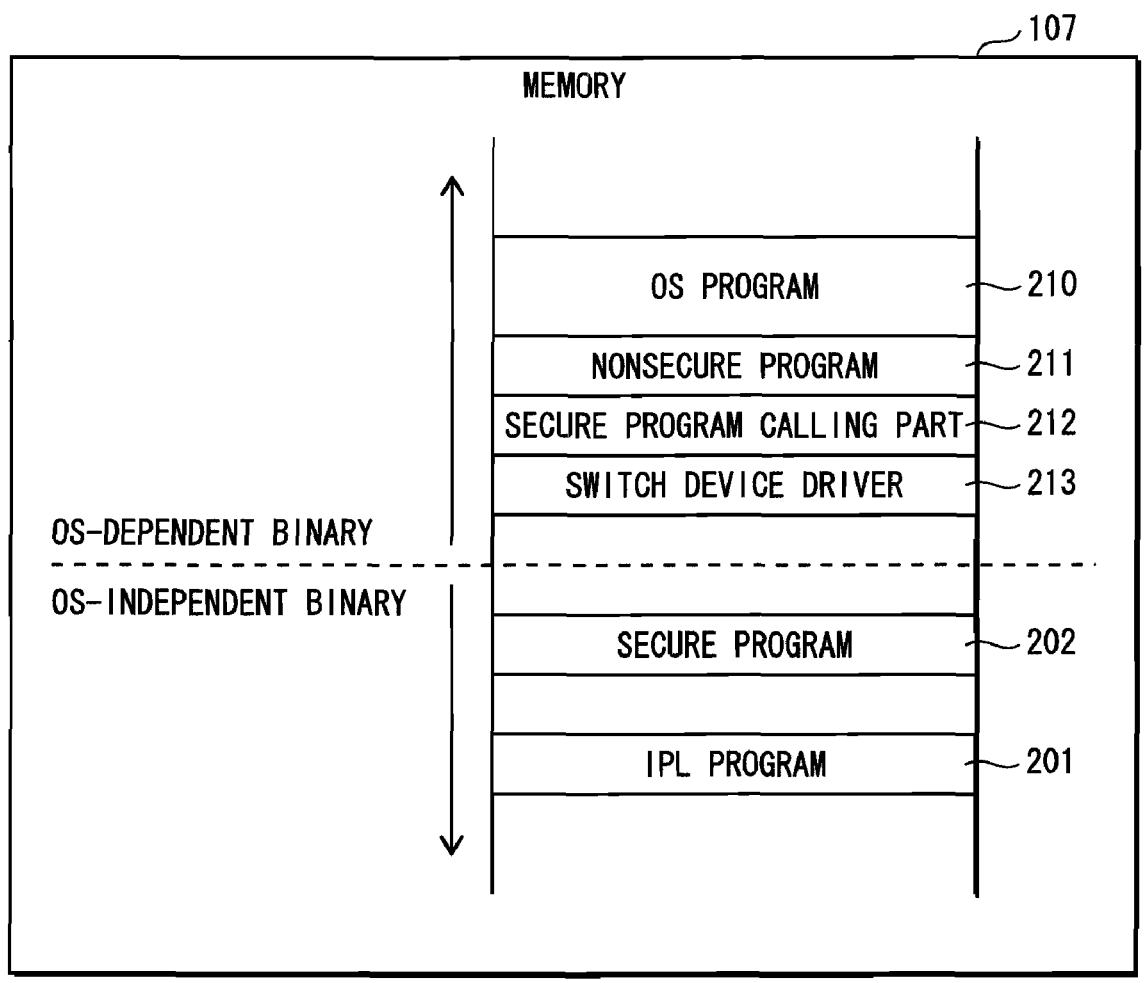
FIG. 5 is an arrangement diagram showing data arrangement of a memory 107.

The structure of the memory 107 is shown in FIG. 5. The memory 107 is composed of a ROM and a RAM. The ROM and RAM are not depicted in FIG. 5 in a distinguished manner; their distinctions are however shown in FIG. 7.

As shown in an example of FIG. 5, the memory 107 stores therein an OS program 210, the nonsecure program 211, the secure program calling part 212, the switch device driver 213, the secure program 202, and an IPL (Initial Program Loader) program 201.

Furthermore, in the present embodiment, two areas—a controlled area controlled by the OS and an uncontrollable area which is beyond the control of the OS—are allocated in the memory 107. The nonsecure program 211, secure program calling part 212 and switch device driver 213 that operate on the OS are stored in the OS controlled area. On the other hand, the IPL program 201 and secure program 202 are stored in the OS uncontrollable area. The way of the allocation is to be later described.

Thus, since the secure program 202 operates in the OS uncontrollable area, which is beyond the OS control, an analysis cannot be made via a software debugger operating on the OS. As a result, the secure program 202 can be executed in a secure state.

(Descriptions of Programs)

The IPL program 201 is a code (a computer program) written in an assembly language, initializes hardware required for starting up the OS, and includes an instruction to cause branching to a kernel initialization process of the OS. In addition, the IPL program 201 includes an instruction to initialize data of a ZI section A 711 to be later described.

The OS program 210 is an operating system, and is basic software that performs initialization of hardware used by the OS at the time of the kernel initialization, settings of the MMU 103, memory control, file control, provision of a user interface and the like.

The nonsecure program 211, secure program calling part 212 and switch device driver 213 are a group of programs that operate on memory controlled by the OS.

The nonsecure program 211 is an application which does not need to be executed in a secure environment. An application for managing the GUI of the mobile telephone 10, a program for managing personal schedules, and a music playback application are examples of the nonsecure program 211. To play back content, it is necessary to securely apply a decryption process to the encrypted content 121 stored in the memory card 20 using the content key 131 stored in the memory card 20. The music playback application includes a decryption process request that calls the secure program calling part 212. The decryption process request indicates a request for a process of decrypting the encrypted content 121 with the use of the content key 131.

The secure program calling part 212 is a calling program for executing the secure program 202, and requests the switch device driver 213 to execute the secure program 202.

The switch device driver 213 acts as an interface for transferring a process to the secure program 202 stored in the OS uncontrollable area.

The secure program 202 is a program that performs a process using confidential information. In the present embodiment, the secure program 202 is a decryption program that decrypts the encrypted content 121 using the content key 131. In addition, the secure program 202 performs a zero initialization process of a ZI section B 712 (to be later described) immediately after being started up.

Note that the memory 107 is, in the present embodiment, composed of a ROM and a RAM; however, the present invention is not limited to this case. The memory 107 is sufficient if it includes a program storage unit for storing therein a program and a work memory storage unit for storing therein a work memory used when the program is in operation. For example, a HDD (Hard Disk Drive), an EEPROM (Electrically Erasable Programmable ROM), a FlashROM or the like may be used as the program storage unit; a SDRAM (Synchronous DRAM) or a SRAM (Static RAM) may be used as a work memory storage unit.

Each of the above-mentioned OS program 210, nonsecure program 211, secure program calling part 212 and switch device driver 213 is generated by the compilation apparatus 30 as one or more pieces of OS-dependent binary data. The secure program 202 is generated by the compilation apparatus 40 as one or more pieces of OS-independent binary data.

The one or more pieces of OS-dependent binary data and one or more pieces of OS-independent binary data generated in this way are written to the ROM by a ROM writer. FIG. 5 shows the ROM to which the writing has been made in such a manner.

(Structure of Sections in Each Piece of Binary Data)

Here described is the structure of sections in each piece of OS-dependent binary data generated by compilation and linking of the compilation apparatus 30.

Figure 6:
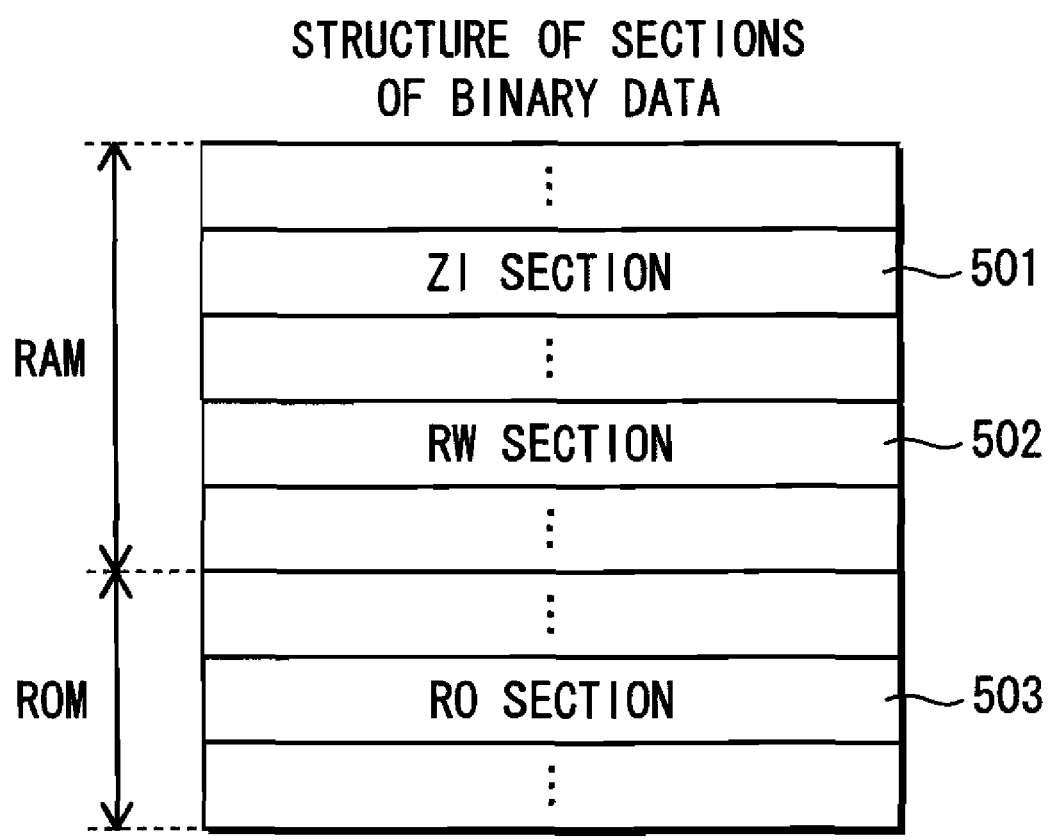
FIG. 6 is an arrangement diagram showing an arrangement of individual sections of binary data.

Each piece of OS-dependent binary data is composed of a ZI section 501, an RW section 502 and an RO section 503, as shown in FIG. 6.

The ZI section 501 is a data area subject to zero initialization. At a stage of initialization of each program, the data in this section must be initialized to zeros.

The RW section 502 is a readable and writable section, in which readable and writable data is placed.

The ROM section 503 is a read-only section, in which an executable code (an instruction) is placed.

FIG. 5 does not depict, in a distinguished manner, the ROM and the RAM making up the memory 107 of FIG. 5; however, as shown in FIG. 6, the ZI section and RW section of each piece of OS-dependent binary data are placed in the RAM and the RO section thereof is placed in the ROM.

The respective pieces of OS-independent binary data 440a, 440b, ... generated by compilation and linking of the compilation apparatus 40 are individually composed of the ZI section, RW section and RO section, as shown in FIG. 6.

Prior to start-up of the secure program 202, the ZI section of the secure program 202 must be initialized to zeros. However, if the size of the ZI section is large, the zero initialization process requires a time. Regarding electronic apparatuses whose response performance is seen as an important aspect, it is preferable that the initialization process be performed in the least possible amount of time so that the secure program 202 can be started up at a high speed.

In order to realize the speeding up, the ZI section is divided into multiple subsections, then the zero initialization process is performed on a part of the subsections before the secure program 202 is started up, and the zero initialization process on the remaining subsections is performed immediately after the start-up of the secure program 202. By thus dividing up, the initialization process of the secure program 202 can be speeded up. The sequence is to be later described with the aid of FIGS. 10 and 11.

(Logical Address and Physical Address of Memory 107)

The relationship between a logical address and a physical address in the memory 107 is briefly described next.

Addresses used in each program are logical addresses, and the MMU 103 converts the logical addresses into physical addresses to actually make access to the memory 107. That is, it is logical addresses that are used in the above-mentioned OS program 210, nonsecure program 211, secure program calling part 212, switch device driver 213 and secure program 202 to indicate storage spaces formed by the memory 107. The MMU 103 converts the logical addresses used in these programs into physical addresses, and access is then made to, in the storage spaces formed by the memory 107, an area indicated by the physical addresses.

When it is immediately after the mobile telephone 10 is powered on and the initialization of the MMU 103 is yet to be performed, logical addresses have not been assigned to each program. In addition, the logical/physical address conversion can be performed when the MMU 103 is in an enabled state.

(Memory Map of Memory 107)

FIG. 7 shows a correspondence between physical addresses and logical addresses in the memory 107.

In the memory 107, the secure program 202, IPL program 201, OS program 210, nonsecure program 211, secure program calling part 212 and switch device driver 213 are placed, as described above. In addition, an OS main memory 601 and a secure program work memory 602 are also placed therein.

Here, the secure program 202 is placed in an OS uncontrollable area 651 of the ROM; the OS program 210, nonsecure program 211, secure program calling part 212 and switch device driver 213 are placed in an OS-controlled area 652 of the ROM. The OS main memory 601 is placed in an OS-controlled area 653 of the RAM; the secure program work memory 602 is placed in an OS uncontrollable area 654 of the RAM.

In an area, within the ROM, that lies from a physical address 0x08000000 to a physical address 0x080C0000, the IPL program 201 is present. The IPL program 201 is a code (a program instruction) executed prior to start-up of the OS program 210. Logical addresses are not assigned to the IPL program 201. Note that, in the present specification, the string following "0x" is given in hexadecimal.

The OS program 210, nonsecure program 211, secure program calling part 212 and switch device driver 213 are present in an area, within the ROM, that lies from a physical address 0x080D0000 to a physical address 0x0BE10000. To this area, logical addresses 0xD0000000 to 0xD3D40000 are assigned by the OS.

The OS main memory 601 is a work memory used by the OS and programs operating on the OS, and is present in an area, within the RAM, that lies from a physical address 0x10000000 to a physical address 0x11E00000. To this area, logical addresses 0xC0000000 to 0xC1E0000 are assigned.

The secure program 202 is an execution code (a program instruction) of a secure program. The secure program 202 is present in an area, within the ROM, that lies from a physical address 0x00260000 to a physical address 0x00350000. To this area, logical addresses 0FFA00000 to 0FFAFFFFF are assigned.

The secure program work memory 602 is a work memory used by the secure program 202, and is present in an area, within the RAM, that lies between physical addresses 0x11F00000 and 0x11FFFFFF. To this area, logical addresses 0xFFB00000 and 0xFFBFFFFF area assigned.

The specification of logical addresses described as above is performed in the kernel initialization process of the OS program 210.

The address specifying file 322 stored in the compilation apparatus 30 and used by the OS-dependent link unit 320 and the address specifying file 422 stored in the compilation apparatus 40 and used by the OS-independent link unit 420 are written in a manner that the above-described address assignment is realized.

In the present embodiment, the physical addresses and logical addresses are assigned in the above-mentioned manner; however, the address assignment changes depending on an implementation target apparatus, and the present invention is not limited to the address values above.

(Secure Program 202 and Secure Program Work Memory 602)

Figure 8:
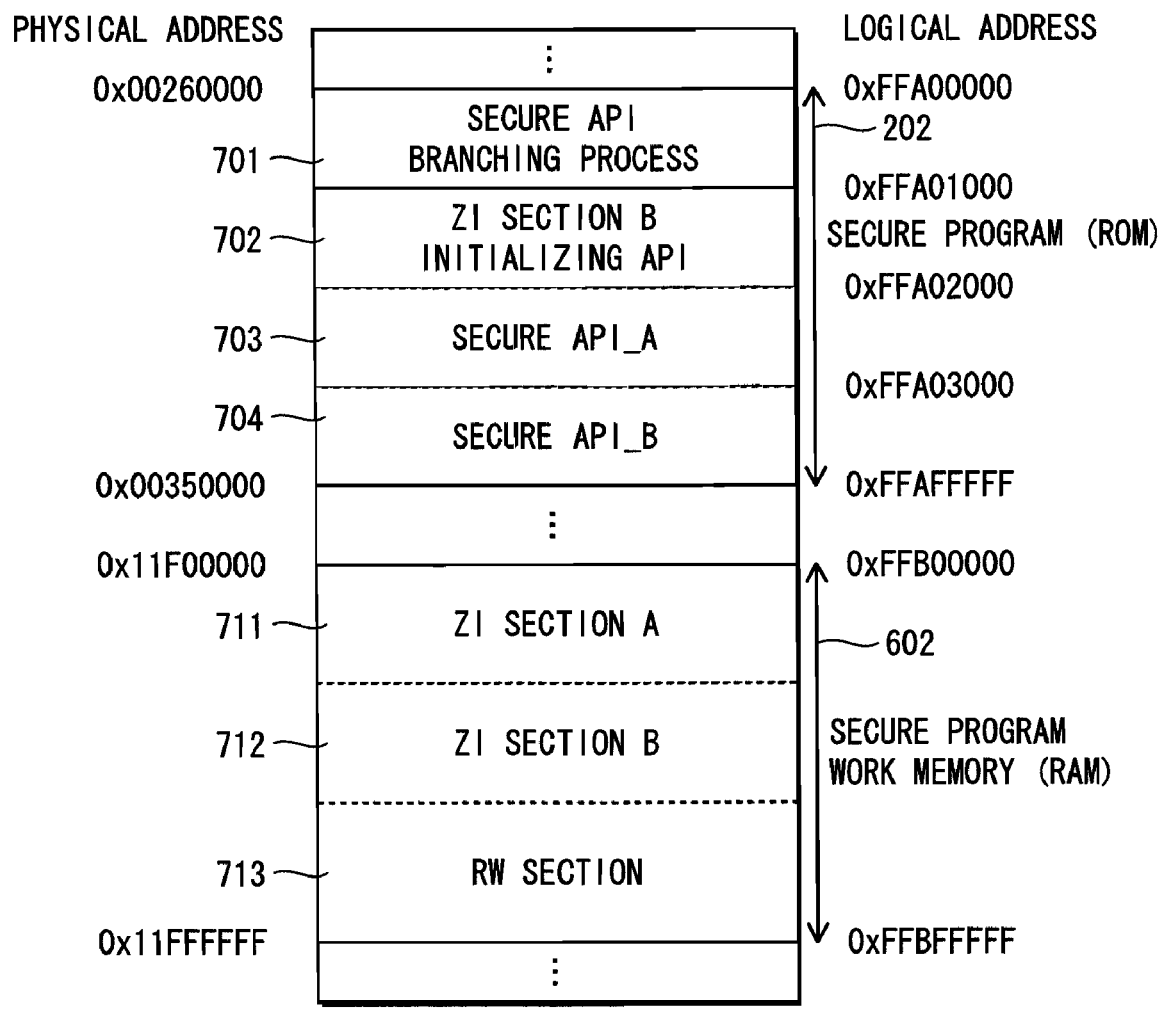
FIG. 8 is an arrangement diagram showing contents of a secure program 202 and a secure program work memory 602.

The following gives a more detailed description of the secure program 202 and secure program work memory 602 with reference to FIG. 8.

The secure program work memory 602 is composed of a ZI section A 711, a ZI section B 712, and an RW section 713. The ZI section A 711 and ZI section B 712 are created by dividing the ZI section into two.

The ZI section A 711 and ZI section B 712 are zero-initialized prior to execution of the secure program 202. These sections are data storage sections that store therein data used by the secure program 202. In the present embodiment, the ZI section is divided into the ZI section A 711 and the ZI section B 712 in order to speed up the initialization process of the secure program 202.

In the zero initialization process of the ZI section of the secure program work memory 602, the zero initialization process of the ZI section A 711 is performed by the IPL program 201 immediately after the mobile telephone 10 is powered on. Then, a content playback request is made by the user, and the zero initialization process of the ZI section B 712 is performed by the secure program 202 immediately after start-up of the secure program 202.

Thus, by executing the zero initialization process of the ZI section A 711 before the content playback request is made by the user, it is possible to cut down the period of time from the time point after the content playback request by the user is made to the time point at which the initialization process of the secure program 202 is completed. This results in shortening the waiting time of the user. In addition, by breaking up the initialization process of the ZI section, it is possible to make it difficult for an unauthorized analyzer to analyze the secure program 202.

The RW section 713 is an area that stores therein readable and writable data used by the secure program 202.

The secure program work memory 602 may be used as a stack area of the secure program 202.

The secure program 202 is composed of: a secure API branching process 701; a ZI section B initializing API 702; a secure API_A 703; and a secure API_B 704.

The secure API branching process 701, ZI section B initializing API 702, secure API_A 703 and secure API_B 704 are individually stored in areas, within the secure program 202, whose starting locations are indicated by logical addresses "0xFFA00000", "0xFFA01000", "0xFFA02000" and "0xFFA03000", respectively, as shown in FIG. 8.

The secure API branching process 701 stores therein an API branch table 800 (to be later described) including branch address information for each of the ZI section B initializing API 702, the secure API_A 703, and the secure API_B 704.

An identifier for identifying each API of the secure program 202 is output from the secure program calling part 212 to the secure API branching process 701 via the switch device driver 213. The secure API branching process 701 receives an identifier from the switch device driver 213, extracts a branch address corresponding to the received identifier from the API branch table 800, and branches to execution of the extracted branch address.

The ZI section B initializing API 702 is an execution code (a program instruction) to perform the zero initialization process of the ZI section B 712.

Each of the secure API_A 703 and secure API_B 704 is an execution code (a program instruction) to perform an API process of the secure program.

Embodiment 1 is described using two secure APIs of the secure program, i.e. the secure API_A 703 and secure API_B 704; however, the present invention is not limited to this case, and two or more secure APIs may be provided.

(Data Structure of API Branch Table 800)

The data structure of the API branch table 800 is shown in FIG. 9.

The API branch table 800 is composed of multiple pieces of branch address information 811, 812 and 813. The branch address information 811, 812 and 813 corresponds to the ZI section B initializing API 702, the secure API_A 703, and the secure API_B 704, respectively, included in the secure program 202. Each piece of the branch address information includes an identifier and a branch address.

Here, the identifier is identification information for identifying an API corresponding to branch address information including the identifier. In addition, the branch address is a logical address indicating a location, within the secure program 202, which stores therein an API corresponding to branch address information that includes the branch address.

The following gives a more detailed description of the branch address information 811, 812 and 813.

The branch address information 811 includes, as shown in FIG. 9, an identifier 801 of "1" and a branch address 802 of "0xFFA01000". The branch address information 811 indicates that the identifier 801 of "1" has been assigned to the ZI section B initializing API 702 and an execution code (a program instruction) of the ZI section B initializing API 702 is stored in an area, within the secure program 202, whose starting location is indicated by the logical address "0xFFA01000".

Accordingly, if "1" is specified as the identifier and then branching is made to "0xFFA01000" by the secure API branching process 701, the ZI section B initializing API 702 is executed.

The branch address information 812 includes, as shown in FIG. 9, an identifier 803 of "2" and a branch address 804 of "0xFFA02000". The branch address information 812 indicates that the identifier 803 of "2" has been assigned to the secure API_A 703 and an execution code (a program instruction) of the secure API_A 703 is stored in an area, within the secure program 202, whose starting location is indicated by the logical address "0xFFA02000".

Accordingly, if "2" is specified as the identifier and then branching is made to "0xFFA02000" by the secure API branching process 701, the secure API_A 703 is executed.

The branch address information 813 includes, as shown in FIG. 9, an identifier 805 of "3" and a branch address 806 of "0xFFA03000". The branch address information 813 indicates that the identifier 805 of "3" has been assigned to the secure API_B 704 and an execution code (a program instruction) of the secure API_B 704 is stored in an area, within the secure program 202, whose starting location is indicated by the logical address "0xFFA03000".

Accordingly, if "3" is specified as the identifier and then branching is made to "0xFFA03000" by the secure API branching process 701, the secure API_B 704 is executed.

In the present embodiment, the API branch table 800 is composed of multiple pieces of branch address information, each including an identifier and a branch address. However, the present invention is not limited to this structure, and it is sufficient if the API branch table stores therein address information for performing processes of branching to desired APIs.

(3) Sequence of Executing Secure API

The following describes a sequence up to the stage at which a secure API of the secure program 202 is executed.

(a) Sequence up to Start-Up of Application Software

Figure 10:
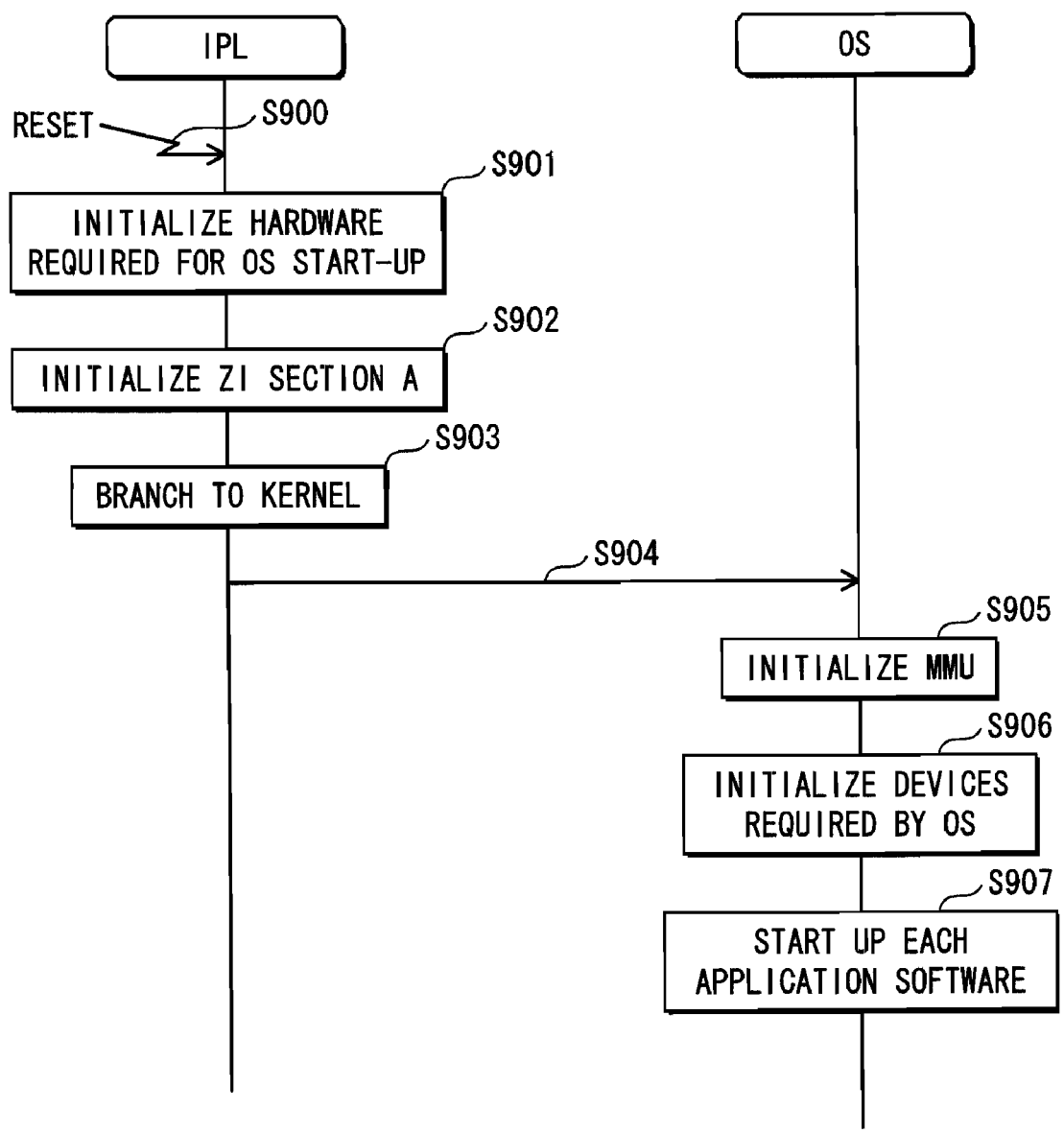
FIG. 10 shows a sequence from start-up of an OS program 210 after a reset up to start-up of application software that operates on the OS.

Here described is the sequence from start-up of the OS program 210 after a reset up to start-up of application software that operates on the OS, with reference to FIG. 10.

In the present embodiment, the initialization process for RAM data of the secure program is, as described above, divided in order to shorten the time required to perform the initialization process for data of the ZI section in the secure program work memory 602, which is located in the OS uncontrollable area of the memory 107 and used by the secure program 202 as a work memory (RAM). Specifically speaking, the initialization process of the ZI section is divided into two stages.

The mobile telephone 10 receives a reset in response to, for example, a power-on operation by the user (Step S900).

After the reset, the IPL program 201 initializes hardware required for start-up of the OS (Step S901).

Next, the IPL program 201 initializes data of the ZI section A 711 (Step S902).

After the initialization of the data in the ZI section A 711 is finished, branching is made to the kernel (Steps S903-S904).

After the branch to the kernel, the initialization process of the kernel shown below is performed. In the initialization process of the kernel, the MMU 103 is first initialized (Step S905), and then various devices included in the mobile telephone 10 and used by the OS are initialized (Step S906).

With the end of the kernel initialization, the OS is started up, which is followed by start-up of each application software (Step S907).

Here, some application software may be started up in response to a user's operation. With the execution of Step S907, its function as a mobile phone is enabled and the mobile telephone 10 is brought into a state of being able to receive and make calls, allowing the user to carry out various operations on the mobile telephone.

(b) Sequence up to Execution of Secure Program 202

Figure 11:
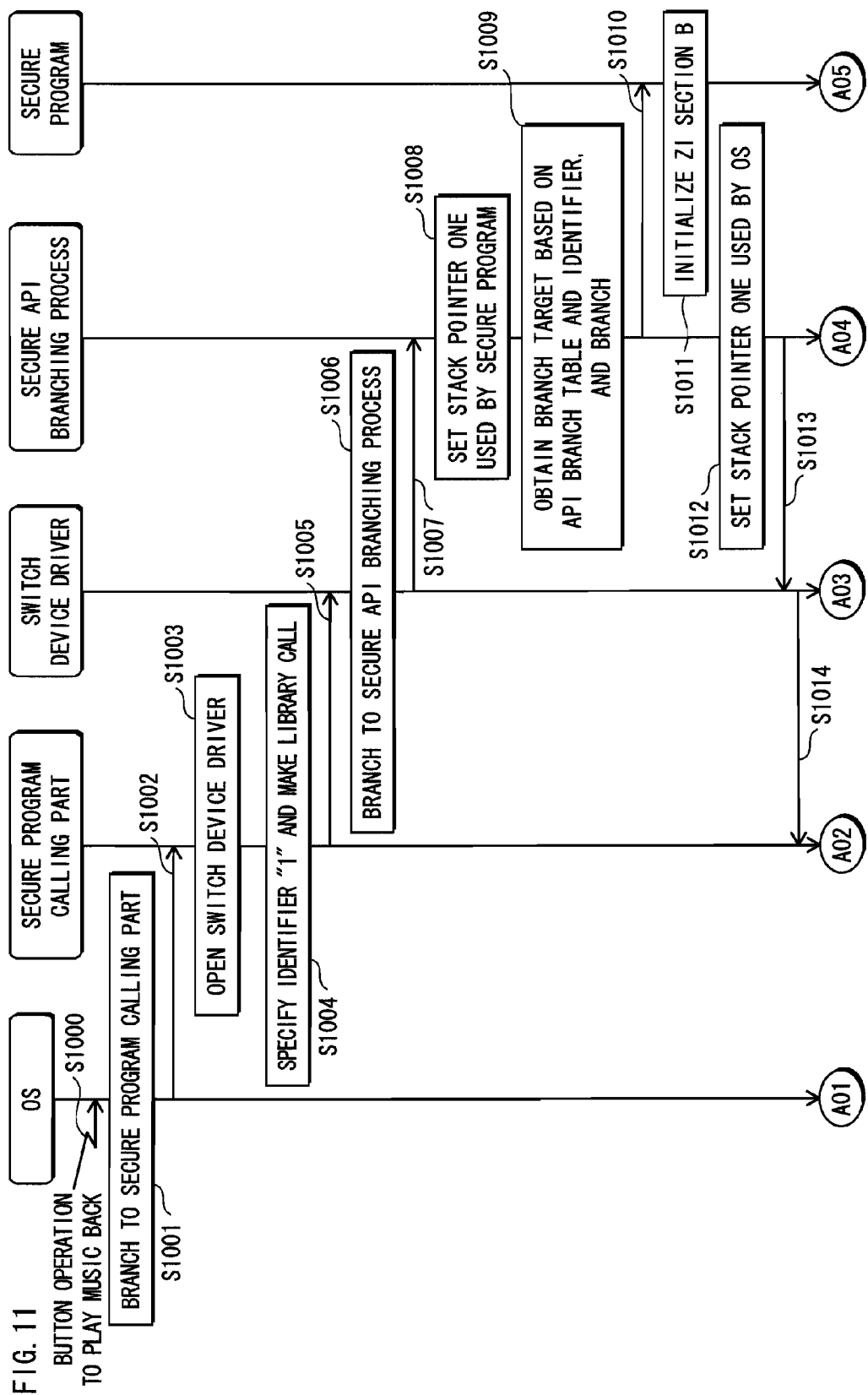
FIG. 11 shows a sequence up to completion of an initialization process for a ZI section of the secure program 202.
Figure 12:
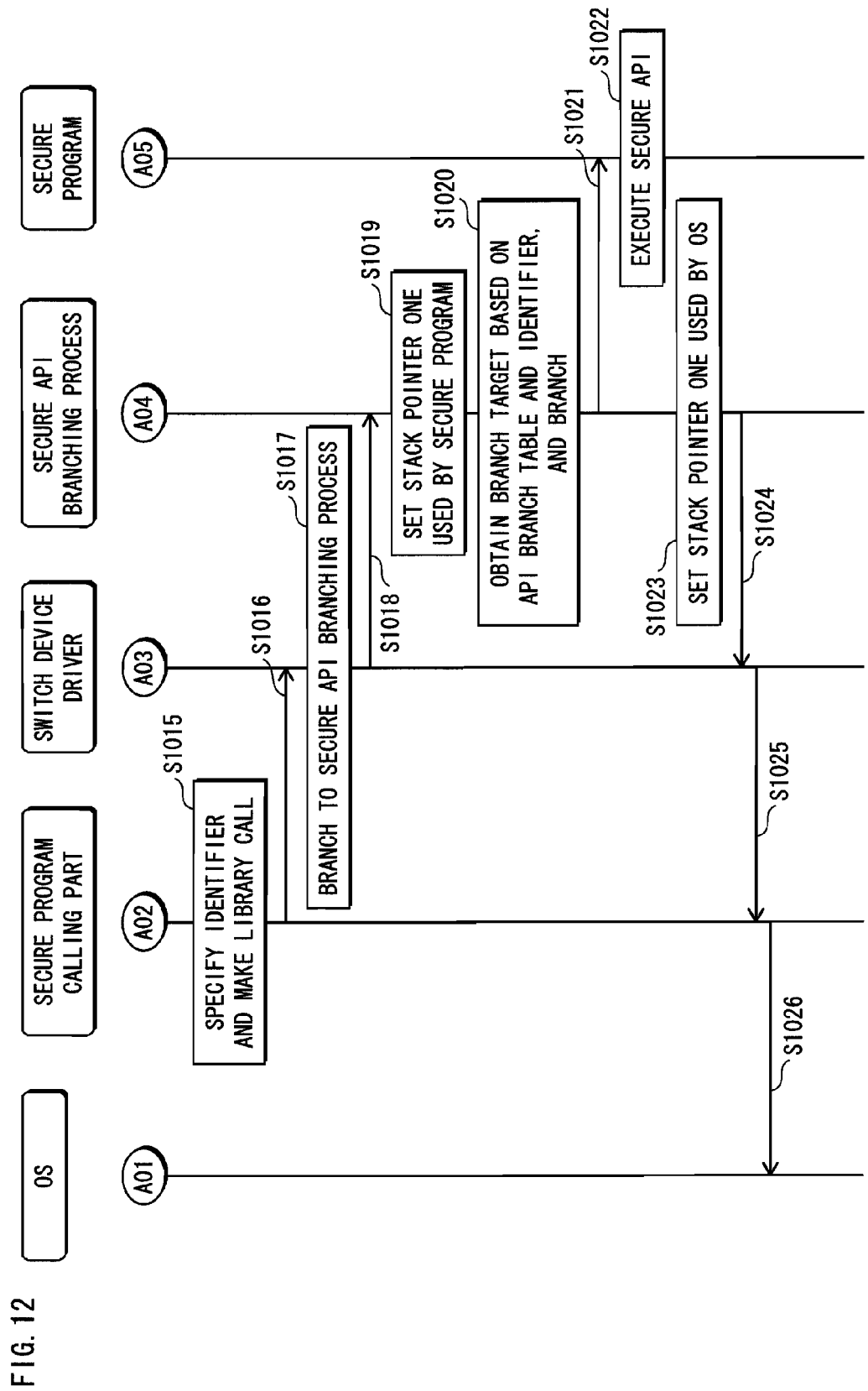
FIG. 12 shows a sequence from a point after the completion of the initialization process for the ZI section of the secure program 202 up to start-up of a secure API.

Here, the sequence up to execution of the secure program 202 is described in reference to FIGS. 11 and 12.

FIG. 11 shows a sequence up to completion of the initialization process for the ZI section of the secure program 202; FIG. 12 shows a sequence from the point after the completion of the initialization process for the ZI section of the secure program 202 up to start-up of the secure API.

When the user makes a button operation to play music back (Step S1000), the OS transfers the process to the secure program calling part 212 (Steps S1001-S1002).

Next, the secure program calling part 212 opens the switch device driver 213 (Step S1003), specifies "1" as the identifier, and makes a library call to the switch device driver 213. Herewith, the process is transferred to the switch device driver 213 (Steps S1004-S1005).

Then, the switch device driver 213 after receiving the identifier "1" branches to the secure API branching process 701, causing the process to be transferred to the secure API branching process 701 (Steps S1006-S1007).

The secure API branching process 701 changes settings of the stack pointer back to one used by the secure program 202 (Step S1008), and obtains a branch address corresponding to the identifier "1" from the API branch table 800. Here, the branch address 802, "0xFFA01000", of ZI section B initializing API 702 corresponding to the identifier "1" is obtained, and then branching is made to an execution code stored in a storage location indicated by the logical address "0xFFA01000"—i.e. the ZI section B initializing API 702 (Steps S1009-S1010).

When the process is branched to "0xFFA01000", the ZI section B initializing API 702 is executed (Step S1011). Herewith, the initialization of the ZI section B 712 is completed.

When the initialization of the ZI section B 712 is completed, the secure API branching process 701 changes the settings of the stack pointer back to one used by the OS (Step S1012).

Subsequently, the process is transferred to the secure program calling part 212 that operates on the OS (Steps S1013-S1014).

According to the above-described procedure, the initialization of the ZI section A 711 and the ZI section B 712 used by the secure API_A 703 and the secure API_B 704, respectively, is completed.

Next, the secure program calling part 212 specifies an identifier of the secure API, and makes a library call to the switch device driver 213. Herewith, the process is transferred to the switch device driver 213 (Steps S1015-S1016).

The switch device driver 213 outputs the specified identifier to the secure API branching process 701, and the process is branched to the secure API branching process 701 (Steps S1017-S1018).

The secure API branching process 701 changes the settings of the stack pointer back to one used by the secure program 202 (Step S1019), next obtains a branch address corresponding to the received identifier from the API branch table 800, and branches to the obtained branch address (Steps S1020-S1021).

Next, the API process of the secure program 202 stored in a location indicated by the branch address is executed (Step S1022).

When the process of the secure API is finished, the secure API branching process 701 changes the settings of the stack pointer back to one used by the OS (Step S1023), and subsequently the process is transferred to the secure program calling part 212 and then to the OS (Steps S1024-S1026).

The process from Step S1015 to Step S1026 shown in FIG. 12 can be performed several times after the completion of the process from Step S1000 to Step S1014 shown in FIG. 11. This is because the completion of all steps of FIG. 11 means the completion of the initialization process of the ZI section that should be initialized at the time of the execution of the secure program.

Note that, in the present embodiment, the secure API_A 703 is a computer program for obtaining a content key and the secure API_B 704 is a computer program for decrypting the encrypted content 121 using the content key 131.

In this case, all the steps shown in FIG. 11 are first executed and the initialization of the ZI section is completed. Next, all the steps shown in FIG. 12 are executed using "2" as the identifier, to thereby obtain the content key 131. Subsequently, all the steps shown in FIG. 12 are executed using "3" as the identifier, to thereby decrypt the encrypted content 121.

2. Modifications

The present invention has been described based on the above embodiment; however, it is a matter of course that the present invention is not limited to the embodiment. The following cases are also within the scope of the present invention.

(1) The secure program 202 may be designed such that, in the case where an interrupt, such as an IRQ, FIQ or software interrupt, takes place during the execution of the secure program 202, (i) the process by the secure program 202 is temporarily suspended, (ii) secure data that is a process target of the secure program 202 is encrypted, (3) the encrypted secure data is decrypted after a process corresponding to the interrupt is completed, and (4) the process by the secure program is continued from the temporarily suspended point. Specifically, the following procedure is carried out.

An initialization completion flag of the secure program 202 is provided for the ZI section A 711, which is an area initialized by the IPL, or for the ZI section B 712, which is an area initialized by the secure program 202. The initialization completion flag is set to "1" after the initialization of the ZI section B 712 by the secure program 202 is completed, and always remains as "1" during the execution of the secure program 202.

Thus, the initialization completion flag may be provided for the ZI section. However, it is not limited to the ZI section, and the initialization completion flag may be provided for the RW section.

In computer systems, when an IRQ, FIQ or software interrupt or the like takes place, branching is generally made to an exception vector table of the CPU. In the exception vector table, an interrupt process routine has been registered for each interrupt factor. Therefore, based on the exception vector table, branching is made to an interrupt process routine with respect to each interrupt factor, and then a desired interrupt process is performed.

In the present modification, a registration is made in the exception vector table in advance such that branching will be made to the secure program 202 when an interrupt takes place. Herewith, each time when an interrupt takes place, the process is once transferred to the secure program 202.

Figure 13:
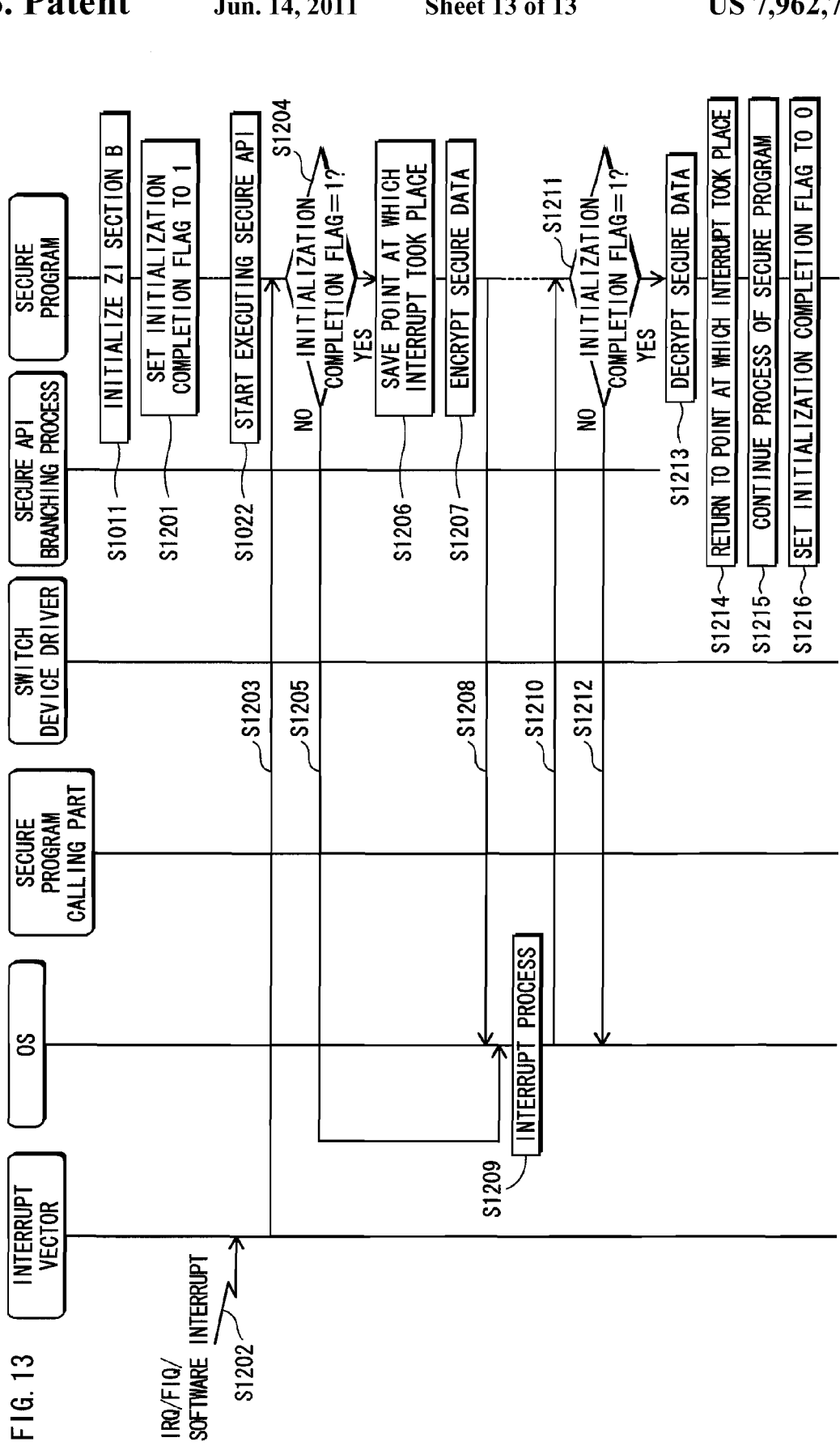
FIG. 13 shows a sequence carried out when an interrupt takes place during execution of the secure program 202.

The following describes a sequence carried out when an interrupt takes place during the execution of the secure program 202, with the aid of FIG. 13.

When completing the initialization of the ZI section B (Step S1011), the secure program 202 sets the initialization completion flag to "1" (Step S1201).

The initialization completion flag always remains as "1" during the execution of the secure program 202.

The secure program 202 starts the execution of the secure API (Step S1022).

When an IRQ, FIQ or software interrupt or the like takes place (Step S1202), the process is transferred to the exception vector table of the CPU. Since a vector has been registered to the exception vector table such that branching is made to the secure program 202, branching is made to the secure program 202 (Step S1203).

After the branch to the secure program 202, the secure program 202 judges whether the initialization completion flag is "1" (Step S1204).

If the initialization completion flag is "1" (YES in Step S1204), a process of the secure program 220 is in execution, and therefore the secure program 202 saves a point at the time of the interrupt occurrence (Step S1206). Then, the secure program 202 encrypts secure data (runtime data) pertaining to secure information used by the secure program 202 in execution to generate encrypted secure data (Step S1207). After the generation of the encrypted secure data, the process is transferred to the OS (Step S1208), and the OS performs an interrupt process (Step S1209). When the interrupt process is finished, the process is transferred to the secure program 202 (Step S1210). Subsequently, the secure program 202 judges whether the initialization completion flag is "1" (Step S1211). If the initialization completion flag is "1" (YES in Step S1211), the secure program 202 decrypts the encrypted secure data to generate decrypted secure data (Step S1213). The secure program 202 returns to the point at which the process of the secure program 202 was suspended (Step S1214) and continues the process of the secure program 202 (Step S1215).

Immediately before the process of the secure program 202 is finished, the secure program 202 sets the initialization completion flag to "0" on (Step S1216), and then the execution of the secure program 202 is finished.

If the initialization completion flag is not "1" (NO in Step S1204, or NO in Step S1211), and the process is transferred to the OS (Step S1205, or Step S1212).

(2) In the above embodiment, the secure program 202 is a decryption program for decrypting encrypted content; however, the present invention is not limited to this, and it may be a program that deals with confidential information.

(3) In the above embodiment, the switch device driver 213 functions as a switch interface for making a switch from OS-dependent binary data to OS-independent binary data. However, without using the switch device driver 213, branching may be made directly from the secure program calling part 212 to the secure API branching process 701.

(4) In the above embodiment, the secure API branching process 701 changes settings of the stack pointer back to one used by the secure program 202, and again changes the settings back to one used by the OS. However, the present invention is not limited to this case.

The switch device driver 213 may include an instruction to save, when a switch is made from the OS to the secure program, the stack pointer being used by the OS at the time of the switch and change settings of the stack pointer back to a previously saved secure program stack pointer. In addition, the switch device driver 213 may include an instruction to save, when a switch is made from the secure program to the OS, the stack pointer being used by the secure program at the time of the switch and change settings of the stack pointer back to a previously saved OS stack pointer.

In addition, the secure API branching process 701 may perform the above procedure.

(5) The above-mentioned secure program may be part of a program making up a BIOS (Basic Input/Output System). The BIOS is generally a program group for controlling peripheral devices, such as a disk drive, a keyboard and a video card, connected to a computer.

(6) In the above embodiment, the compilation apparatuses 30 and 40 are discrete apparatuses; however, the present invention is not limited to this case. One compilation apparatus may be configured with components of both compilation apparatuses 30 and 40 included therein.

This compilation apparatus comprises: a $1^{st}$ compilation unit operable to compile source codes structuring the operating system to generate $1^{st}$ object codes; a $1^{st}$ link unit operable to perform symbol resolution and relocation of the $1^{st}$ object codes and link a program included in a $1^{st}$ library to generate executable format $1^{st}$ software that is the operating system; a $2^{nd}$ compilation unit operable to compile source codes structuring a process that uses confidential information to generate $2^{nd}$ object codes; and a $2^{nd}$ link unit operable to perform symbol resolution and relocation of the $2^{nd}$ object codes and link a program included in a $2^{nd}$ library to generate executable format $2^{nd}$ software that is the process using the confidential information.

(7) The above embodiment shows no example in which tamper resistant technology is applied to the secure program sources; however, tamper resistant technology may be applied to the secure program sources.

The tamper resistant technology involves obfuscation of an original code (a program instruction) by, for instance, adding thereto an unnecessary and redundant code which has no influence on the execution, replacing an instruction code by a different equivalent instruction code, introducing complexity into the control structure, or dividing one module (a group of program instructions) into multiple modules. Or the technology involves pre-encryption of the original code and decryption at the time of the execution. The security level of the secure program 202 may be improved by applying such tamper resistant technology. In the case of applying code encryption, a RAM area in which a decrypted code is expanded should be an area to which the OS cannot make access, i.e. an OS uncontrollable area.

This technology is detailed in Non-patent references 1, 2 and 3, and therefore the explanation is omitted here.

(8) In the above embodiment, the zero initialization process of the ZI section A 711 is executed by the IPL program 201, then a content playback request is made by the user, and the zero initialization process of the ZI section B 712 is executed by the secure program 202 immediately after start-up of the secure program 202. However, the present invention is not limited to this case.

The IPL program 201 may execute the zero initialization process of a part of variables in the ZI section A 711, and the secure program 202 may execute the zero initialization process of a part of variables in the ZI section B 712.

In addition, the above embodiment and modifications describe the case in which the ZI section is initialized with zero values; however, the present invention is not limited to this. A fixed value other than the zero values, e.g. "0xffff" may be written to the ZI section.

As has been described, the present invention is a secure processing apparatus comprising a program storage unit and a data storage unit. In this case, the program storage unit stores therein $1^{st}$ software and $2^{nd}$ software, and the data storage unit includes a $1^{st}$ data storage subunit and a $2^{nd}$ data storage subunit. The $1^{st}$ data storage subunit is an area accessible by the $1^{st}$ software, and the $2^{nd}$ data storage subunit is an area accessible by the $2^{nd}$ software. The $1^{st}$ software cannot make access to the $2^{nd}$ data storage subunit.

Here, the $1^{st}$ software may be an operating system, and the $2^{nd}$ software may be software that uses confidential information.

Here, a source code of the $1^{st}$ software may be input to a $1^{st}$ compiler, which outputs $1^{st}$ object codes. In this case, a $1^{st}$ linker has a function to perform symbol resolution and relocation of the $1^{st}$ object codes and link a $1^{st}$ library. The $1^{st}$ object codes are input to the $1^{st}$ linker, which outputs the $1^{st}$ software. The $1^{st}$ software is executable data created by the $1^{st}$ compiler and the $1^{st}$ linker. A source code of the $2^{nd}$ software is input to a $2^{nd}$ compiler different from the $1^{st}$ compiler, and then the $2^{nd}$ compiler outputs $2^{nd}$ object codes. A $2^{nd}$ linker different from the $1^{st}$ linker has a function to perform symbol resolution and relocation of the $2^{nd}$ object codes and link a $2^{nd}$ library group. The $2^{nd}$ object codes are input to the $2^{nd}$ linker, which outputs the $2^{nd}$ software. The $2^{nd}$ software is executable data created by the $2^{nd}$ compiler and the $2^{nd}$ linker.

Here, the $2^{nd}$ software may be software resistant to tampering and analysis.

Here, the initialization process of the $2^{nd}$ data storage subunit used by the $2^{nd}$ software may be divided into at least one or more divisional initialization processes.

Here, among the divisional initialization processes, at least one or more divisional initialization processes may be executed prior to an occurrence of a request for executing the $2^{nd}$ software.

Here, the divisional initialization processes may be stored dispersedly in the program storage unit to be executed prior to the execution of the $2^{nd}$ software.

Here, the program storage unit may further include an IPL, which executes at least one or more of the divisional initialization processes.

Here, the program storage unit may further include a switch device driver, which makes a process transfer from the $1^{st}$ software to the $2^{nd}$ software.

Here, the switch device driver may manage a $1^{st}$ stack pointer used by the $1^{st}$ software and a $2^{nd}$ stack pointer used by the $2^{nd}$ software. In the case of the execution of the $1^{st}$ software, the switch device driver sets a stack pointer to the $1^{st}$ stack pointer; in the case of the execution of the $2^{nd}$ software, the switch device driver sets the stack pointer to the $2^{nd}$ stack pointer.

(10) Specifically speaking, each apparatus above is a computer system composed of a microprocessor, ROM, RAM, and the like. A computer program is stored in the RAM. Here, the computer program is structured by combining multiple instruction codes indicating commands to the computer to achieve predetermined functions. The microprocessor operates according to the computer program, and thereby each apparatus fulfills its functions. That is, the microprocessor fetches and decodes instructions included in the computer program one by one, and operates according to the decoding results.

(11) Part or all of the components making up the above individual apparatuses may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

In addition, individual components making up each apparatus above may respectively be made into discrete chips, or part or all of the components may be made into one chip. Although referred to here as the LSI, it may be also referred to as IC, system LSI, super LSI, or ultra LSI, depending on the degree of integration.

In addition, the method for assembling integrated circuits is not limited to LSI, and a dedicated communication circuit or a general-purpose processor may be used to achieve this. A FPGA (Field Programmable Gate Array), which is programmable after the LSI is produced, or a reconfigurable processor, which allows reconfiguration of the connection and setting of circuit cells inside the LSI, may be used.

If technology for forming integrated circuits that replaces LSIs is introduced, owing to advance in semiconductor technology or different technology derived therefrom, the integration of functional blocks may naturally be accomplished using such technology. There is also a possibility of application of biotechnology to the integrated circuit technology.

(12) Each element, part or all of the components making up the above individual apparatuses may be assembled as an IC card detachable from a device, or as a single module. The IC card/module is a computer system composed of a microprocessor, ROM, RAM, and the like. The IC card/module may include therein the above-mentioned ultra-multifunctional LSI. The microprocessor operates according to a computer program, and thereby the IC card/module accomplishes its function. The IC card/module may be tamper resistant.

(13) The present invention may be a method of accomplishing the above-described system. The present invention may be a computer program that achieves the method by a computer, or may be a digital signal representing the computer program.

The present invention may also be achieved by a computer-readable recording medium, such as a flexible disk, a hard disk, a CD-ROM, an MO disk, a DVD, a DVD-ROM, a DVD-RAM, a BD (Blu-ray Disc), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(14) The present invention includes a structure in which two or more of the above embodiment and modifications are combined.

The secure processing apparatus and method of the present invention are useful to realize a secure software processing method, offering (i) an effect of preventing an analysis through a software debugger operating on the OS by making a program using confidential information operate in a memory outside the control of the OS, and further (ii) an effect of shortening the process up to start-up of the program after a user request is made by performing, in divisions, the initialization process of RAM data of the program operating outside the OS control.

Each apparatus making up the present invention is operationally, continuously and repeatedly applicable in content distribution industries that produce and distribute contents, and also in industries that deal with information, whose confidentiality must be maintained. In addition, each apparatus making up the present invention can operationally, continuously and repeatedly be produced and marketed in electrical apparatus manufacturing industries.

The invention claimed is:

1. A computer system, comprising:
a processor configured to obtain and decode instructions included in a basic program, a normal program and a secure program, and operate according to the decoded instructions; and
a memory unit configured to include a controlled area and an uncontrollable area, the uncontrolled area being different from the controlled area and storing therein the secure program,
wherein the basic program configures an operating system and includes an instruction to mediate access of the normal program to the controlled area as an access space only for access by the normal program, the controlled area storing therein the basic program and the normal program, the normal program including an instruction to access the controlled area via the basic program, and the secure program being independent of the operating system and including an instruction to access the uncontrollable area as an access space only for access by the secure program, the secure program including an instruction to perform a confidentiality process relating to confidential information stored in the uncontrollable area,
wherein the controlled area further stores therein a switch program including an instruction to switch from execution of the basic program to execution of the secure program in response to a direction of the basic program, the processor being configured obtain and decode the instruction included in the switch program and operate according to the decoded instruction, and the basic program further includes an instruction to switch to execution of the secure program and the secure program further includes an instruction to switch from execution of the secure program to execution of the basic program after the confidentiality process is finished, and
wherein the switch program includes (i) an instruction to change settings of a stack pointer back to a stack pointer used b the basic program at a time of switching from execution of the secure program to execution of the basic program and (ii) an instruction to change the settings of the stack pointer back to a stack pointer used by the secure program at a time of switching from execution of the basic program to execution of the secure program.

2. The computer system of claim 1,
wherein the secure program is obfuscated.

3. The computer system of claim 1,
wherein the secure program requires an initialization process and the initialization process is performed by a plurality of programs.

4. The computer system of claim 3,
wherein the plurality of programs are executed prior to the confidentiality process.

5. The computer system of claim 4,
wherein at least one of the plurality of programs is executed at a timing different from a timing at which another one of the programs is executed.

6. The computer system of claim 5,
wherein the at least one of the plurality of programs is executed immediately after reset of the computer system, and
the other one of the plurality of programs is included in the secure program and executed when execution of the secure program is requested.

7. An integrated circuit, comprising:
a processor configured to obtain and decode instructions included in a basic program, a normal program and a secure program, and operate according to the decoded instructions; and
a memory unit configured to include a controlled area and an uncontrollable area, the uncontrolled area being different from the controlled area and storing therein the secure program,
wherein the basic program configures an operating system and includes an instruction to mediate access of the normal program to the controlled area as an access space only for access by the normal program, the controlled area storing therein the basic program and the normal program, the normal program including an instruction to access the controlled area via the basic program, and the secure program being independent of the operating system and including an instruction to access the uncontrollable area as an access space only for access by the secure program, the secure program including an instruction to perform a confidentiality process relating to confidential information stored in the uncontrollable area,
wherein the controlled area further stores therein a switch program including an instruction to switch from execution of the basic program to execution of the secure program in response to a direction of the basic program, the processor being configured obtain and decode the instruction included in the switch program and operate according to the decoded instruction, and the basic program further includes an instruction to switch to execution of the secure program and the secure program further includes an instruction to switch from execution of the secure program to execution of the basic program after the confidentiality process is finished, and
wherein the switch program includes (i) an instruction to change settings of a stack pointer back to a stack pointer used by the basic program at a time of switching from execution of the secure program to execution of the basic program and (ii) an instruction to change the settings of the stack pointer back to a stack pointer used by the secure program at a time of switching from execution of the basic program to execution of the secure program.

8. A program generation apparatus, comprising:
a processor configured to obtain and decode instructions included in a basic program, a normal program and a secure program, and operate according to the decoded instructions;

a memory unit configured to include a controlled area and an uncontrollable area, the uncontrolled area being different from the controlled area and storing therein the secure program;

a computer program configured to generate, from source codes configuring an operating system, $1^{st}$ object codes that access only a controlled area of an execution target apparatus; and a computer program configured to generate, from source codes of a process that uses confidential information, $2^{nd}$ object codes that access only an uncontrollable area of the execution target apparatus, the uncontrollable area being different from the controlled area, wherein the controlled area further stores therein a switch program including an instruction to switch from execution of the basic program to execution of the secure program in response to a direction of the basic program, the processor being configured obtain and decode the instruction included in the switch program and operate according to the decoded instruction, and the basic program further includes an instruction to switch to execution of the secure program and the secure program further includes an instruction to switch from execution of the secure program to execution of the basic program after the confidentiality process is finished, and wherein the switch program includes (i) an instruction to change settings of a stack pointer back to a stack pointer used by the basic program at a time of switching from execution of the secure program to execution of the basic program and (ii) an instruction to change the settings of the stack pointer back to a stack pointer used by the secure program at a time of switching from execution of the basic program to execution of the secure program.

9. A non-transitory computer-readable recording medium storing a basic program and a secure program, wherein wherein the basic program configures an operating system and includes an instruction to mediate access of a normal program to a controlled area of an execution target apparatus as an access space only for access by the normal program, the controlled area storing therein the basic program and the normal program, the normal program including an instruction to access the controlled area via the basic program, and the secure program being independent of the operating system and including an instruction to access an uncontrollable area of the execution target device as an access space only for access by the secure program, the secure program including an instruction to perform a confidentiality process relating to confidential information stored in the uncontrollable area, wherein the controlled area further stores therein a switch program including an instruction to switch from execution of the basic program to execution of the secure program in response to a direction of the basic program, the processor being configured obtain and decode the instruction included in the switch program and operate according to the decoded instruction, and the basic program further includes an instruction to switch to execution of the secure program and the secure program further includes an instruction to switch from execution of the secure program to execution of the basic program after the confidentiality process is finished, and wherein the switch program includes (i) an instruction to change settings of a stack pointer back to a stack pointer used by the basic program at a time of switching from execution of the secure program to execution of the basic program and (ii) an instruction to change the settings of the stack pointer back to a stack pointer used by the secure program at a time of switching from execution of the basic program to execution of the secure program.

* * * * *